(12) United States Patent
Takanashi

(10) Patent No.: US 6,330,051 B1
(45) Date of Patent: Dec. 11, 2001

(54) IMAGE PROCESSING APPARATUS

(75) Inventor: Teruo Takanashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/533,242

(22) Filed: Mar. 22, 2000

(30) Foreign Application Priority Data

Mar. 25, 1999 (JP) .................................. 11-81696

(51) Int. Cl.$^7$ .......................... G03B 27/52; G03B 17/24; H04N 1/46
(52) U.S. Cl. ......................... 355/40; 358/501; 396/310; 396/319
(58) Field of Search ...................... 355/40, 54; 396/564, 396/578, 319, 310; 358/501, 527, 506, 504

(56) References Cited

U.S. PATENT DOCUMENTS

| | | | |
|---|---|---|---|
| Re. 36,535 | * 1/2000 | Hicks | ..................................... 430/21 |
| 5,229,810 | * 7/1993 | Cloutier et al. | ........................ 355/40 |
| 5,551,021 | * 8/1996 | Harada et al. | ........................ 395/600 |
| 5,671,072 | * 9/1997 | Umemoto | .............................. 358/501 |
| 5,745,318 | * 4/1998 | Sugahara et al. | ....................... 355/40 |
| 5,940,169 | * 8/1999 | Masutani | .................................. 355/40 |
| 5,943,054 | * 8/1999 | Hirano et al. | ......................... 345/348 |
| 5,991,010 | * 11/1999 | Nishio | ..................................... 355/82 |
| 6,104,469 | * 8/2000 | Yamamoto | .............................. 355/29 |
| 6,115,558 | * 9/2000 | Saito et al. | ............................ 396/311 |

* cited by examiner

Primary Examiner—Russell Adams
Assistant Examiner—Rodney Fuller
(74) Attorney, Agent, or Firm—Sughrue, Mion, Zinn, Macpeak & Seas, PLLC

(57) ABSTRACT

There is provided an image processing apparatus in which a test operation of each image can be executed smoothly by effectively utilizing magnetic information or optical information, which is recorded on a recording medium. During test processing, when the number of frame images to be displayed on a test image 204 is less than 28, a display mode of magnetic information to be displayed correspondingly to the frame images is altered to the form of words and phrases. Further, when the number of frame images to be displayed on the test image 204 is 28 or more, the display mode of magnetic information to be displayed correspondingly to the frame images is altered to the form of abbreviation (FFy).

12 Claims, 19 Drawing Sheets

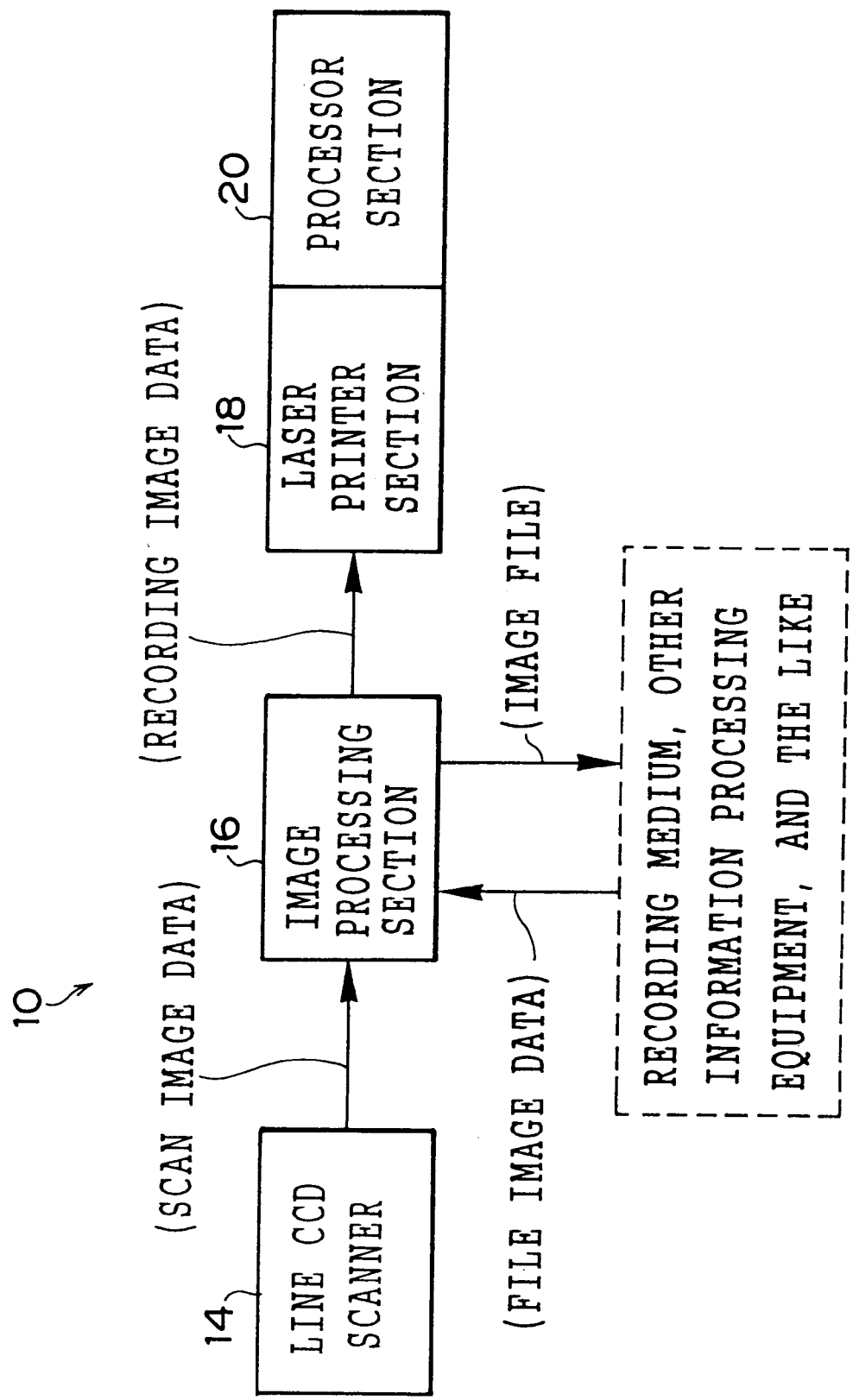

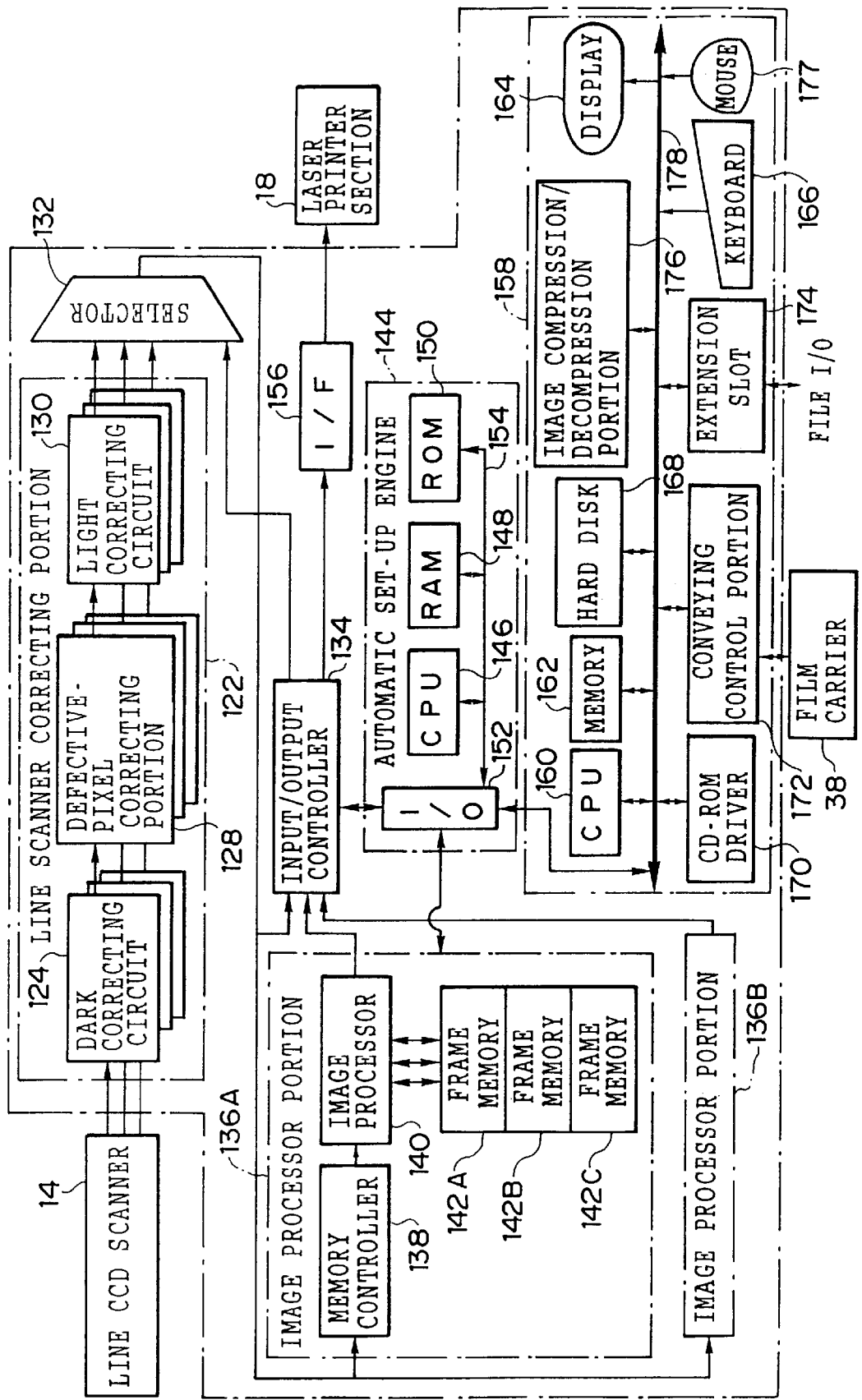
F I G. 5

F I G. 1 4
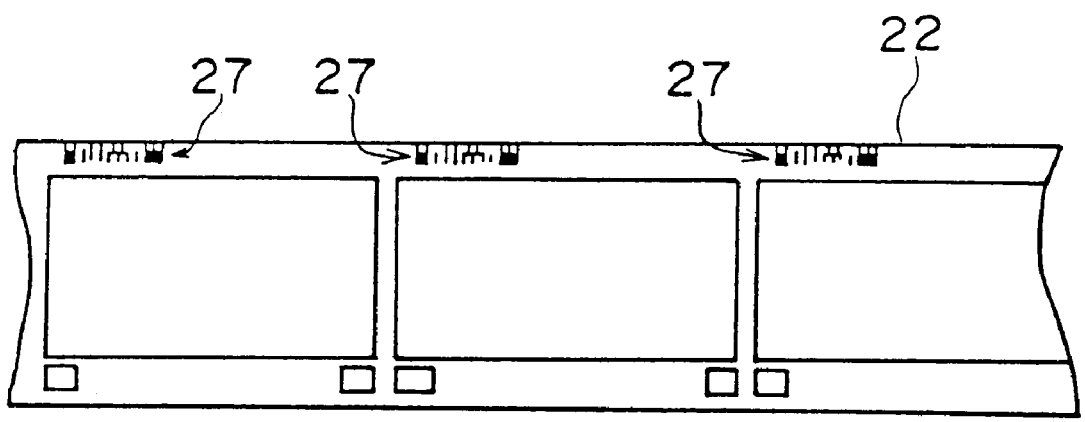

FIG. 16

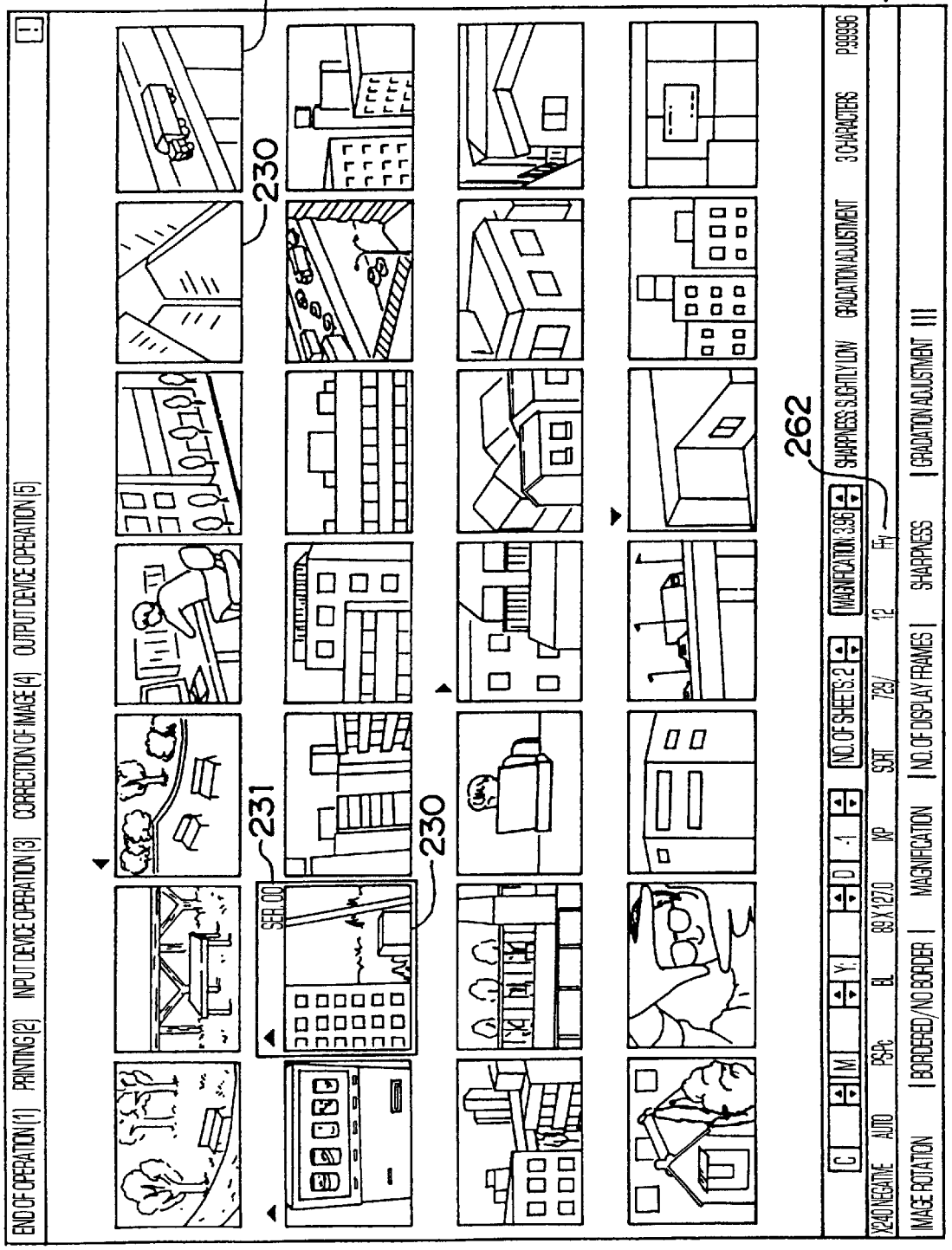

IMAGE PROCESSING APPARATUS

BACKGROUND OF THE INVENTION

1. Field of the Invention

The present invention relates to an image processing apparatus, and particularly to an image processing apparatus in which image data to be recorded on a recording material is prepared based on image data recorded on a recording medium on which one image or plural images and collateral information including photographic information of the image or of each of the plural images are recorded.

2. Description of the Related Art

In recent years, there has been known a technique in which a frame image recorded on a photographic film is read photoelectrically with a reading sensor such as a CCD, and image processing, such as enlargement/reduction or various corrections, is carried out with respect to digital image data obtained by the above reading, and further, an image is printed onto a recording material by using laser light modulated based on digital image data subjected to the image processing.

In this technique for reading a frame image in a digital manner with a reading sensor such as a CCD, in order to realize precise reading of the image, the frame image is preliminarily read (so-called pre-scan), and a reading condition (for example, the amount of light irradiated on the frame image, the charge accumulation time of the CCD, and the like) corresponding to the density of the frame image, or the like is determined, and further, the frame image is read again under the determined reading condition (so-called fine scan). Further, prior to execution of the fine scan, or after execution of the fine scan, or during execution of the fine scan, a test operation of an image processing condition for image data of each frame image is carried out.

In the test operation, the image processing condition for each frame image is determined in such a manner that a testing image based on digital image data of each frame image is displayed on a display, and an operator visually confirms the testing image so as to determine whether the density or the color balance of the testing image is proper, and if not proper, the processing condition with respect to each frame image is corrected.

On the other hand, in recent years, there has been used a film (for example, an APS film) in which various information such as information regarding the condition at the time of photographing each frame image (for example, whether or not a flash was used, the photographing date, the shutter speed, the size at the time of photographing, and whether or not a continuous scene was photographed) can be recorded, as magnetic or optical information (for example, a bar code) at a predetermined position on the surface of the film.

However, conventionally, even when, as described above, a test operation is effected for a frame image of a film on which various information such as information regarding the condition at the time of photographing each frame image is recorded, it is not possible to effect the test operation while collating each frame image with the information regarding the condition at the time of photographing for the frame image, and in the test operation, the above-described magnetic or optical information was not effectively utilized.

The present invention has been devised to solve the above-described drawback and an object thereof is to provide an image processing apparatus in which magnetic information or optical information recorded on a recording medium such as a film can be effectively utilized and a test operation of each image can be smoothly executed.

SUMMARY OF THE INVENTION

In order to achieve the above-described object, there is provided an image processing apparatus according to a first aspect of the present invention, in which image data to be recorded on a recording material is prepared based on image data recorded on a recording medium on which one image or plural images, and collateral information including photographic information of the image or of each of the plural images are recorded, comprising: information display means which displays information; and display control means which simultaneously displays, on the information display means, an image based on the image data recorded on the recording medium and all or a portion of collateral information corresponding to the image in association with each other, wherein the display control means alters at least one of a mode and an amount of the collateral information to be displayed on the information display means in accordance with a number or a size of display images.

Further, an image processing apparatus according to a second aspect of the present invention is characterized, in the image processing apparatus of the first aspect of the present invention, by further comprising indicating means for indicating so that the image and one of the all or the portion of the information is displayed by the display control means.

The image processing apparatus according to the first aspect of the present invention is an image processing apparatus in which the data of the image (output image) to be recorded on the recording material is prepared based on the image data recorded on the recording medium on which one image or plural images and the collateral information including the photographic information thereof are recorded.

In the image processing apparatus as described above, the display control means allows the image based on the image data recorded on the recording medium and all or a portion of the information based on the collateral information corresponding to the image to be simultaneously displayed on the information display means (display) in association with each other.

As a result, during a test operation of each image, an operator can simultaneously refer to the image based on the image data and all or a portion of the collateral information such as the photographic information for the image, in association with each other. Namely, the operator can smoothly execute the test operation for each image while effectively utilizing the collateral information recorded on the recording medium.

The above-described image data and collateral information corresponding to each image may be obtained by reading from a recording medium such as a photographic film or CD-R (additional recordable compact disk) or may be inputted from an external image processing apparatus or the like.

When the image based on the image data recorded on the recording medium and all or a portion of information based on the collateral information corresponding to the image are simultaneously displayed on the information display means (display) in association with each other, if the number of display images increases or the size of a display image becomes larger, there are cases in which it may be difficult to grasp the collateral information corresponding to and displayed simultaneously with the image.

Accordingly, the display control means of the present invention alters, in accordance with the number of display images or the size of a display image, at least one of a mode and an amount of the collateral information to be displayed on the information display means.

As a result, all or a portion of the collateral information corresponding to the image and simultaneously displayed with the image can be easily recognized.

Further, as described in the second aspect of the present invention, the image processing apparatus may further comprise the indicating means for indicating so that the image and all or a portion of the information are displayed by the display control means, and the image processing method may further comprises the step of indicating displaying the image and one of the all or the portion of the information. In this case, the operator give indication to the display provided by the display control means through the indicating means, with desired timing during the test operation of the image, and thereby allows display of information corresponding to the image such as the information regarding the condition at the time of photographing based on the collateral information.

The collateral information includes plural information and the display control means displays, on the information display means, information selected from the plural information.

The collateral information includes plural information and a priority order is set for the plural information. The display control means displays at least one information of the collateral information on the information display means in accordance with the priority order.

An image processing apparatus in which image data to be recorded on a recording material is prepared based on image data recorded on a recording medium on which plural images and collateral information including photographic information of each of the images are recorded, is characterized by comprising: information display means which displays information; and display control means which simultaneously displays, on the information display means, plural images based on the image data recorded on the recording medium and all or a portion of collateral information corresponding to the images in association with each other, wherein the display control means allows enhancement of collateral information corresponding to one image selected from the plural images.

Further, the display control means displays all or a portion of the collateral information of the selected one image in a predetermined region.

Moreover, the display control means allows enlargement of the region in which all or a portion of the collateral information of the image is displayed, and when the region is enlarged, the display control means increases collateral information to be displayed.

The display control means effects deleting images other than the selected one image and collateral information of the images, to thereby allow enhancement of the selected one image, and the display control means displays the collateral information of the selected one image in the deleted region.

In addition, an image processing apparatus in which image data to be recorded on a recording material is prepared based on image data recorded on a recording medium on which one image or plural images, and collateral information including photographic information of the image or of each of the images are recorded is characterized by comprising: information display means which displays information; and display control means which simultaneously displays, on the information display means, an image based on the image data recorded on the recording medium and all or a portion of collateral information corresponding to the image in association with each other, wherein the display control means displays the image in a region having a predetermined size and provided for the image, and further displays all or a portion of the collateral information corresponding to the image in a remaining part of the region.

BRIEF DESCRIPTION OF THE DRAWINGS

FIG. 1 is a schematic structural view of a digital laboratory system according to an embodiment of the present invention.

FIG. 5 is a structural view which schematically shows the structure of an image processing section.

FIG. 14 is a diagram which shows a film on which optical information is recorded.

FIG. 16 is a diagram which shows a display region of collateral information of images to be tested, and a test image.

FIG. 19 is a diagram which shows a test image in which collateral information of images other than an image to be tested are not displayed.

DESCRIPTION OF THE PREFERRED EMBODIMENT

Figure 2:
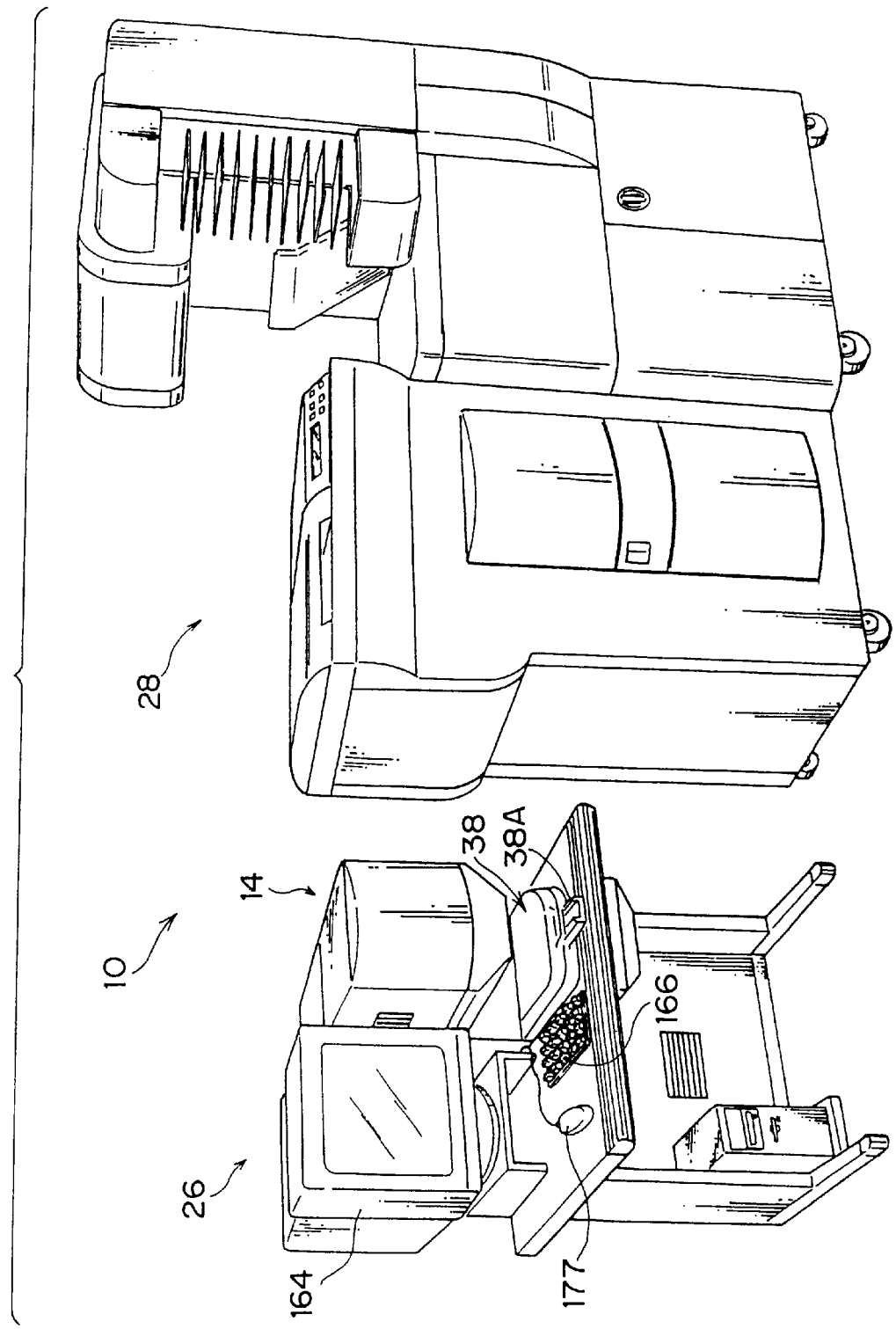
FIG. 2 is an outside view of the digital laboratory system.

Referring now to the attached drawings, an embodiment of the present invention will be hereinafter described. Overview of an entire system:

First, a description will be given of a digital laboratory system according to the embodiment of the present invention. FIG. 1 shows a schematic structure of a digital laboratory system 10 according to the embodiment of the present invention. FIG. 2 shows the exterior appearance of the digital laboratory system 10. As shown in FIG. 1, the laboratory system 10 is structured to include a line CCD scanner 14, an image processing section 16, a laser printer section 18, and a processor section 20. The line CCD scanner 14 and the image processing section 16 are integrated to form an input section 26 shown in FIG. 2 and the laser printer section 18 and the processor section 20 are integrated to form an output section 28 shown in FIG. 2.

The line CCD scanner 14 is used to read a frame image recorded on a photographic light-sensitive material, for example, a photographic film such as a negative film and a reversal film. Examples of the photographic film on which a frame image to be read is recorded include a photographic film in 135 magazines, a photographic film in 110 magazines, and a photographic film with a transparent magnetic layer formed thereon (i.e., a photographic film in 1×240 magazines: a so-called APS film), and photographic films in 120 magazines and 220 magazines (Brownie size). The line CCD scanner 14 reads the frame image to be read, as described above, by a line CCD and outputs image data.

The image processing section 16 is structured to allow input of image data outputted from the line CCD scanner 14 (i.e., scan image data) and also allow input of image data obtained by photographing using a digital camera, image data obtained by reading an original other than a frame image (for example, a reflection original) by a scanner, image data generated by a computer, and the like (which will be generically referred to as file image data) from the outside (for example, input of image data via a storage medium such as a memory card or input of image data from the other information processing equipment via a communication line).

The image processing section 16 effects image processing including various corrections and the like for the input image data and outputs the image data, as recording image data, to the laser printer section 18. Further, the image processing section 16 also can output the image data subjected to the image processing, as an image file, to the outside (for example, the image data can be outputted to a storage medium such as a memory card or transferred to the other information processing equipment via a communication line).

The laser printer section 18 includes laser light sources of R, G, and B and causes laser light modulated to correspond to the recording image data inputted from the image processing section 16 to be irradiated on a photographic printing paper so as to record an image on the photographic printing paper by scan exposure processing. Further, the processor section 20 effects various processes including color development, bleach-fix, washing, and drying for the photographic printing paper on which an image is recorded by scan exposure processing in the laser printer section 18. As a result, an image is formed on the photographic printing paper.

Structure of Line CCD Scanner

Figure 3:
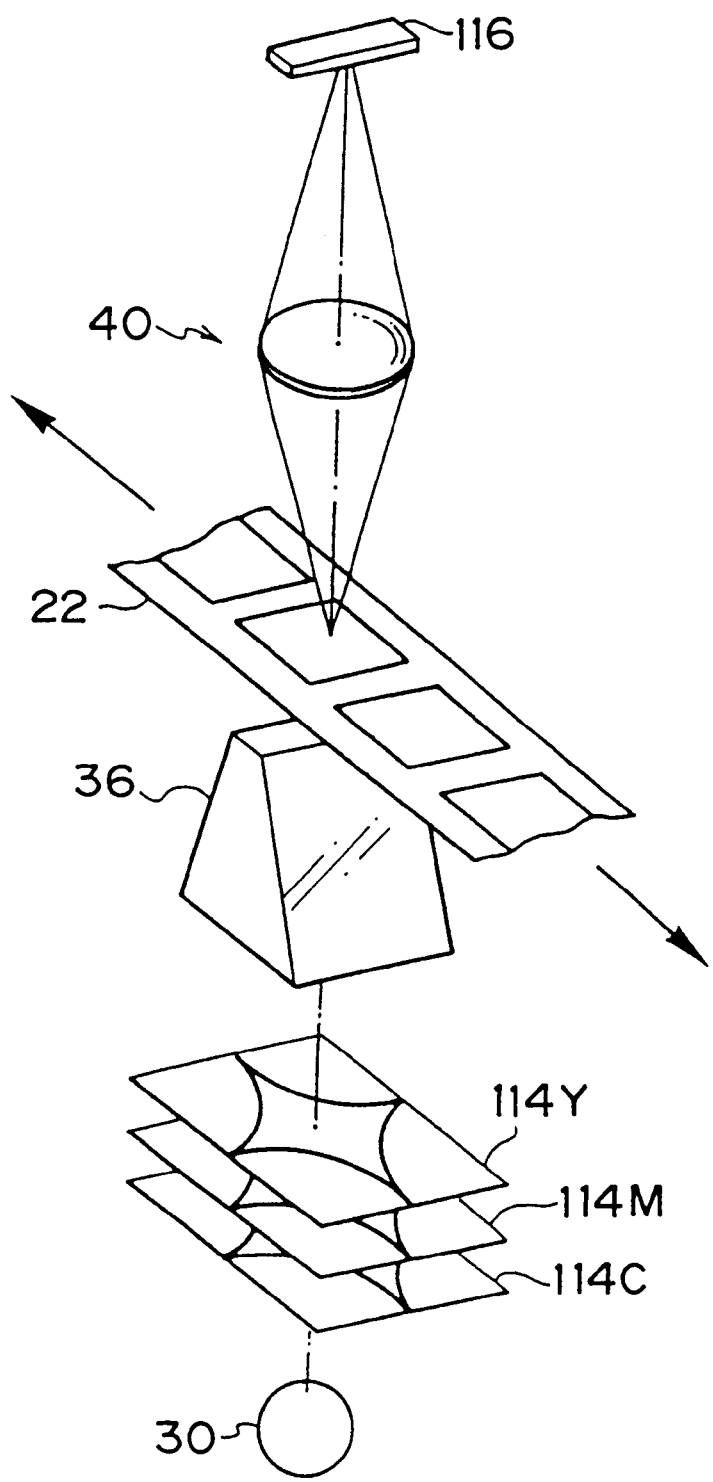
FIG. 3 is a structural view which schematically shows the structure of an optical system of a line CCD scanner.

Next, a description will be given of a structure of the line CCD scanner 14. FIG. 3 shows a schematic structure of an optical system of the line CCD scanner 14. This optical system includes a light source 30 comprised of a halogen lamp or a metal halide lamp which applies light to the photographic film 22. A light diffusion box 36 with which light to be irradiated on the photographic film 22 is made into diffused light is disposed at a light emission side of the light source 30.

The photographic film 22 is conveyed by a film carrier 38 (shown in FIG. 6, but not shown in FIG. 3) disposed at a light emission side of the light diffusion box 36 so that the image plane of an image is made perpendicular to an optical axis. In FIG. 3, there is shown an elongated photographic film 22. However, an exclusively-used film carrier is provided for a slide film held by a holder for a slide for each frame (i.e., a reversal film), or an APS film (a film carrier exclusively used for the APS film has a magnetic head for reading information magnetically recorded on a magnetic layer of the film), and these photographic films can also be conveyed.

Light adjusting filters 114C, 114M, and 114Y of cyan (C), magenta (M), and yellow (Y) are disposed between the light source 30 and the light diffusion box 36 sequentially along the optical axis of emitted light. A lens unit 40 which allows imaging of light transmitted through the frame image and a line CCD 116 are disposed, sequentially along the optical axis, at the side of the photographic film 22 opposite to the side at which the light source 30 is disposed. Although in FIG. 3 a single lens is merely shown as the lens unit 40, the lens unit 40 is actually a zoom lens formed from a plurality of lenses.

The line CCD 116 is structured in such a manner that a sensing portion, in which a large number of CCD cells are disposed in one row and an electronic shutter mechanism is disposed, is provided in each of three lines which are parallel to each other at intervals and color separation filters of R, G, and B are respectively mounted on the light-incidence sides of the sensing portions (i.e., the line CCD 116 is a so-called three-line color CCD). The line CCD 116 is disposed in such a manner that a light receiving surface of each sensing portion coincides with the position of an imaging point of the lens unit 40.

Further, a transfer portion is provided in the vicinity of each sensing portion so as to correspond to the sensing portion. The charge accumulated in each of the CCD cells of each sensing portion is sequentially transferred via a corresponding transfer portion. Although not illustrated, a shutter is provided between the line CCD 116 and the lens unit 40.

Figure 4:
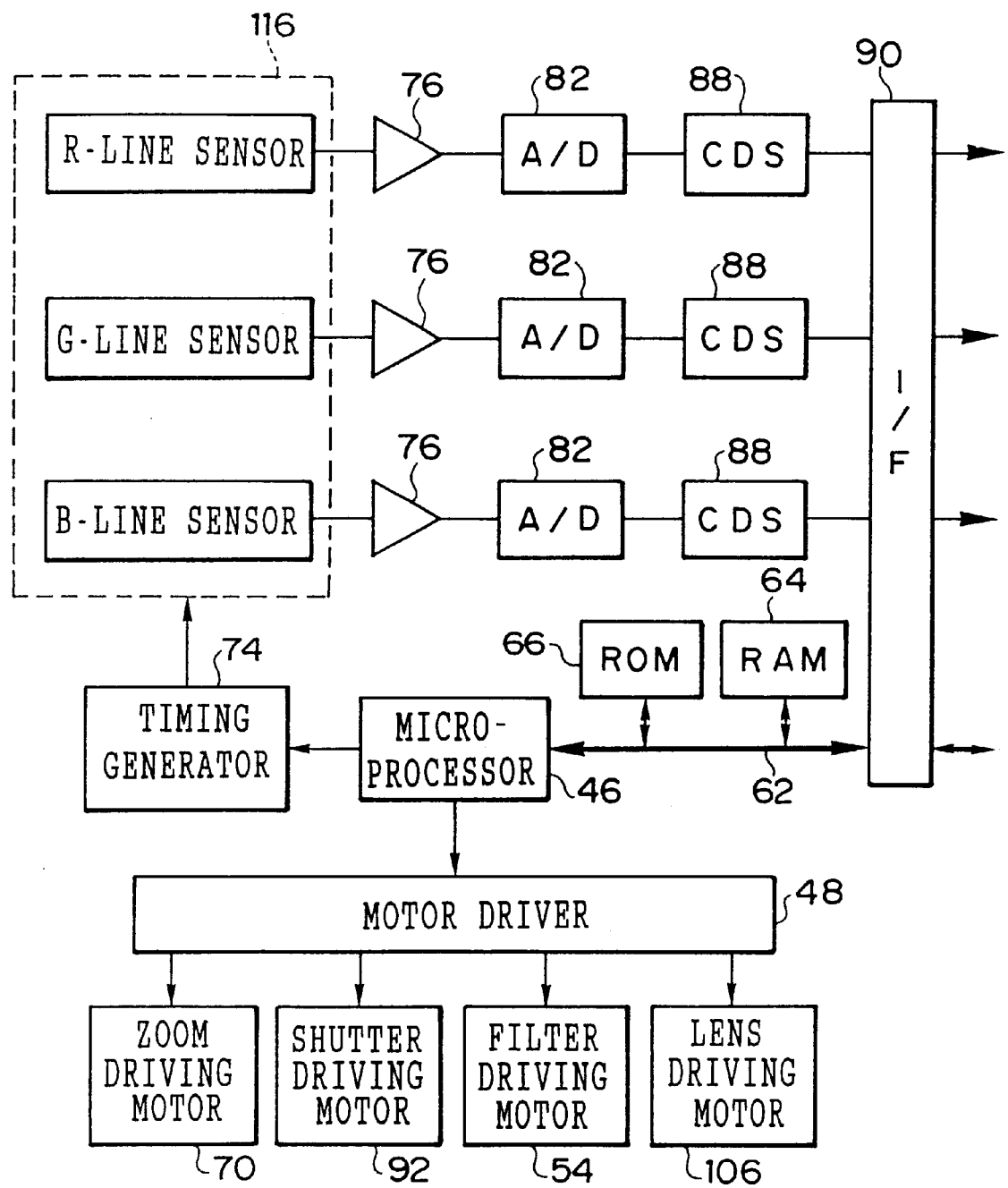
FIG. 4 is a structural view which schematically shows the structure of an electric system of the line CCD scanner.

FIG. 4 shows a schematic structure of an electric system of the line CCD scanner 14. The line CCD scanner 14 includes a microprocessor 46 which effects control of the entire line CCD scanner 14. RAM 64 (for example, SRAM), ROM 66 (for example, ROM which can rewrite the stored content) are connected via a bus 62 to the microprocessor 46, and a motor driver 48 is also connected to the microprocessor 46. A filter driving motor 54 is connected to the motor driver 48. The filter driving motor 54 allows the light adjusting filters 114C, 114M, and 114Y to slide-move independently.

The microprocessor 46 allows the light source 30 to be turned on and off sequentially after an on-off operation of a power source switch (not shown). Further, during reading of a frame image by the line CCD 116 (i.e., photometric processing), the microprocessor 46 causes the filter driving motor 54 to slide-move the light adjusting filters 114C, 114M, and 114Y independently, so as to adjust the amount of light made incident on the line CCD 116 for each of lights of component colors.

Also connected to the motor driver 48 are a zoom driving motor 70 and a lens driving motor 106. The zoom driving motor 70 varies a zoom magnification of the lens unit 40 by relatively moving the positions of the plurality of lenses of the lens unit 40. The lens driving motor 106 moves the position of an imaging point of the lens unit 40 along the optical axis by moving the entire lens unit 40. The microprocessor 46 varies the zoom magnification of the lens unit 40 with the zoom driving motor 70 to a desired magnification in accordance with the size of a frame image or whether or not cropping is carried out.

A timing generator 74 is connected to the line CCD 116. The timing generator 74 generates various timing signals (clock signals) for operating the line CCD 116, A/D converters 82, which will be described later, and the like. Signal output ends of the line CCD 116 are connected to the A/D converters 82 via amplifiers 76 and the signals outputted from the line CCD 116 are amplified by the amplifiers 76 and are converted to digital data in the A/D converters 82.

The output ends of the A/D converters 82 are each connected to an interface (I/F) circuit 90 via a correlated double sampling circuit (CDS) 88. The CDS 88 effects sampling of feed-through data, which indicates the level of a feed-through signal, and pixel data, which indicates the level of a pixel signal, and subtracts the feed-through data from the pixel data for each pixel. The calculated results (pixel data that corresponds correctly to the amounts of charge accumulated in each of the CCD cells) are sequentially outputted, as the scan image data, to the image processing section 16 via the I/F circuit 90.

Photometric signals of R, G, and B are outputted concurrently from the line CCD 116, and therefore, three signal processing systems are provided, each including one each of the amplifiers 76, the A/D converters 82, and the CDSs 88, respectively, and image data of R, G, and B are concurrently outputted, as the scan image data, through the I/F circuit 90.

Further, a shutter driving motor 92 which opens and closes the shutter is connected to the motor driver 48. The dark output level of the line CCD 116 is corrected in an image processing section 16 at a subsequent stage, and when reading of the frame image is not effected, the dark output level can be obtained by the microprocessor 46 closing the shutter.

Structure of Image Processing Section

Next, a description will be given of the structure of the image processing section 16 with reference to FIG. 5. The image processing section 16 has a line scanner correcting portion 122 corresponding to the line CCD scanner 14. The line scanner correcting portion 122 includes three signal processing systems each having a dark correcting circuit 124, a defective-pixel correcting portion 128, and a light correcting circuit 130, correspondingly to the image data of R, G, and B concurrently outputted from the line CCD scanner 14.

Correction in the dark correcting circuit 124 is effected by storing, for each of the cells, data inputted from the line CCD scanner 14 (i.e., data that represents the dark output level of each of the cells of the sensing portions of the line CCD 116) in a state in which the light made incident on the line CCD 116 is cut off by the shutter, and by subtracting from the scan image data inputted from the line CCD scanner 14 the dark output levels of the cells corresponding to each pixel.

Further, the photoelectric conversion characteristic of the line CCD 116 varies for each of the cells. In the light correcting circuit 130, which comes after the defective-pixel correcting portion 128, having set an adjusting image whose entire image surface has a constant density on the line CCD scanner 14, again is set for each of the cells based on image data of the adjusting image inputted from the line CCD scanner 14 after the adjusting image has been read by the line CCD 116 (the variation in density between the pixels represented by the image data results from variations of the photoelectric conversion characteristics of the cells), and image data of a frame image to be read, inputted from the line CCD scanner 14, is corrected for each pixel in accordance with the gain set for each of the cells.

On the other hand, when the density of a specified pixel in the image data of the adjusting frame image is greatly different from that of other pixels, there is some abnormality about the cell of the line CCD 116 corresponding to the specified pixel and it can be determined that the specified pixel is defective. The defective-pixel correcting portion 128 stores an address of the defective pixel based on the image data of the adjusting frame image. Among the image data of the frame image to be read which is inputted from the line CCD scanner 14, data of the defective pixel is interpolated from data of peripheral pixels to allow generation of new data.

Further, since the line CCD 116 is formed in three lines (rows of CCD cells) which are disposed along the conveying direction of the photographic film 22 at predetermined intervals, there is a difference in the time at which output of image data from the line CCD scanner 14 starts, with respect to each of the component colors of R, G, and B. The line scanner correcting portion 122 delays the image-data output timing based on different delay times of the component colors so that the image data of R, G, and B of the same pixel on the frame image are outputted simultaneously.

Output ends of the line scanner correcting portion 122 are connected to input ends of a selector 132 and image data outputted from the correcting portion 122 is inputted to the selector 132. The input end of the selector 132 is also connected to a data output end of an input/output controller 134 and external-input file image data is inputted from the input/output controller 134 to the selector 132. An output end of the selector 132 is connected to each data input end of the input/output controller 134 and the image processor portions 136A and 136B. The selector 132 allows the inputted image data to be selectively outputted to each of the input/output controller 134 and to the image processor portions 136A and 136B.

The image processor portion 136A includes a memory controller 138, an image processor 140, and three frame memories 142A, 142B, and 142C. The frame memories 142A, 142B, and 142C each have a capacity which allows storage of image data of an image of one frame. The image data inputted from the selector 132 is stored in any one of the three frame memories 142 and the memory controller 138 controls an address when the image data is stored in the frame memory 142 so that the inputted image data respectively corresponding to pixels are stored in a storage region of the frame memory 142 in such a state as to be arranged in a fixed order.

The image processor 140 fetches image data stored in the frame memory 142 and effects various image processing including gradation conversion, color conversion, hypertone processing which compresses gradation of extra-low frequency luminance components of an image, hypersharpness processing which enhances sharpness while suppressing granularity, and the like. Meanwhile, the processing condition of the above-described image processing is automatically calculated by an automatic set-up engine 144 (which will be described later) and the image processing is effected in accordance with the calculated processing condition. The image processor 140 is connected to the input/output controller 134, and after the image data subjected to the image processing is temporarily stored in the frame memory 142, the image data is outputted to the input/output controller 134 with predetermined timing. The image processor portion 136B has the same structure as that of the above-described image processor portion 136A, and a description thereof will be omitted.

In the present embodiment, two reading operations are effected for each frame image at different resolutions in the line CCD scanner 14. In the case of the first reading operation at a relatively low resolution (which will be referred to as "pre-scan"), even when the density of a frame image is extremely low (for example, even when an over-exposed negative image on a negative film is used), reading of the frame image is effected under a reading condition which is determined so as to prevent occurrence of saturation of accumulated charge in the line CCD 116 (the amount of light irradiated on the photographic film for each wavelength of light of the colors R, G, and B, and the time of charge accumulated in the CCD). The image data obtained by the pre-scan (i.e., pre-scan image data) is inputted from the selector 132 to the input/output controller 134 and is also outputted to the automatic set-up engine 144 connected to the input/output controller 134.

The automatic set-up engine 144 includes CPU 146, RAM 148 (for example, DRAM), ROM 150 (for example, ROM which can rewrite the stored content), and an input/output port 152, which are connected together via a bus 154.

The automatic set-up engine 144 calculates, based on the pre-scan image data of images of a plurality of frames inputted from the input/output controller 134, a processing condition of the image processing for image data (fine-scan image data) obtained by the second reading operation by the line CCD scanner 14 at a relatively high resolution (which will be hereinafter referred to as "fine scan") and outputs the calculated processing condition to the image processor 140 of the image processor portion 136. In the calculation of the processing condition of the image processing, it is determined from the exposure amount during photographing, the type of a light source for photographing, and other characteristic amounts, whether a plurality of frame images with similar scenes photographed exists. If the plurality of images with similar scenes photographed exists, the processing condition of the image processing for fine-scan image data of these frame images is determined so as to become identical or approximate.

Meanwhile, an optimum processing condition of image processing varies depending on whether the image data after image processing is used for recording of an image on a photographic printing paper in the laser printer section 18 or is outputted externally. The image processing section 16 includes two image processor portions 136A, 136B, and therefore, for example, when the image data is used for recording of an image on a photographic printing paper and is also outputted externally, the automatic set-up engine 144 calculates the processing condition most suitable for each of various purposes and outputs the calculated processing condition to the image processor portions 136A, 136B. As a result, for the same fine-scan image data, image processing is effected in the image processor portions 136A, 136B under different processing conditions.

Moreover, the automatic set-up engine 144 calculates, based on the pre-scan image data of the frame image inputted from the input/output controller 134, an image-recording parameter which defines gray balance when an image is recorded on a photographic printing paper in the laser printer section 18, and outputs the calculated parameter while simultaneously outputting recording image data (described later) to the laser printer section 18. Further, the automatic set-up engine 144 calculates the processing condition for image processing for file image data inputted from the outside in the same way as the aforementioned.

The input/output controller 134 is connected via an I/F circuit 156 to the laser printer section 18. When the image data after image processing is used for recording of an image on a photographic printing paper, the image data subjected to image processing in the image processor portion 136 is outputted, as the recording image data, from the input/output controller 134 to the laser printer section 18 via the I/F circuit 156. Further, the automatic set-up engine 144 is connected to a personal computer 158. When the image data subjected to image processing is outputted externally as an image file, the image data subjected to image processing in the image processor portion 136 is outputted from the input/output controller 134 to the personal computer 158 via the automatic set-up engine 144.

The personal computer 158 includes a CPU 160, a memory 162, a display 164, a keyboard 166 (also seen in FIG. 2), a mouse 177, a hard disk 168, a CD-ROM driver 170, a conveying control portion 172, an extension slot 174, and an image compression/extension portion 176. These components are connected together via a bus 178. The conveying control portion 172 is connected to the film carrier 38 and controls conveying of the photographic film 22 effected by the film carrier 38. Further, when an APS film is set in the film carrier 38, information read from the magnetic layer of the APS film by the film carrier 38 (for example, the image record size) is inputted.

A driver (not shown) which effects data reading/writing for a storage medium such as a memory card, or a communication control device which communicates with other information processing equipment is connected via the extension slot 174 to the personal computer 158. When image data to be outputted externally is inputted from the input/output controller 134, the image data is outputted, as an image file, to the outside (for example, to the above-described driver or communication control device) via the extension slot 174. Further, when file image data is inputted from the outside via the extension slot 174, the inputted file image data is outputted to the input/output controller 134 via the automatic set-up engine 144. In this case, the input/output controller 134 outputs the inputted file image data to the selector 132.

Meanwhile, when the pre-scan image data or the like is outputted to the personal computer 158, a frame image read by the line CCD scanner 14 is shown on the display 164 or an image obtained by being recorded on the photographic printing paper is estimated and shown on the display 164, and an instruction to correct the image, or the like is given by an operator via the keyboard 166, the image processing section 16 also allows the correction of an image to be reflected in the processing condition for image processing.

Further, in the foregoing, there was described an example in which two reading operations for each frame image are effected at different resolutions in the line CCD scanner 14, but only one reading operation may be effected for each frame image at a high resolution.

Structure of Film Carrier for APS Film

In the present embodiment, the film carrier 38 having a function of reading frame images and corresponding magnetic information recorded on the APS film 22 is used as a film carrier. The structure of the film carrier 38 for an APS film will be hereinafter described with reference to FIGS. 6, 7, and 8. Meanwhile, the film carrier 38 is contained in a flat container, which is not shown in FIGS. 6, 7, and 8.

In the film carrier 38 shown in FIGS. 6, 7, and 8, a cartridge 402 in which the APS film 22 is accommodated is set at a predetermined position and various conveying roller pairs and the like, which will be described later, are disposed along a direction in which the APS film 22 is pulled out from the set cartridge 402. Note that the direction in which the APS film 22 is pulled out from the cartridge 402 (i.e., the film pull-out direction) is indicated by arrow J and the direction in which the APS film 22 is rewound into the cartridge 402 (i.e., a film rewinding direction) is indicated by arrow K.

Figure 8:
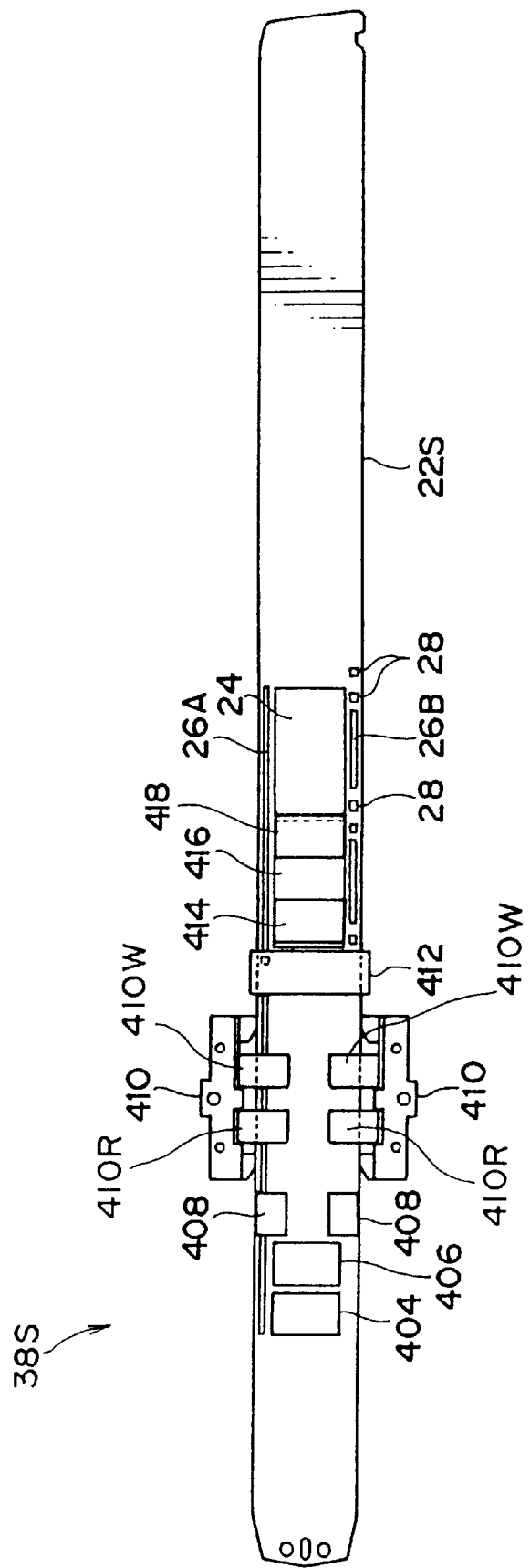
FIG. 8 is a diagram of the film carrier shown in FIG. 6 when seen from a direct upper side thereof perpendicular to the direction in which the film is conveyed.

A conveying roller pair 404, a dust-removing roller pair 406 for removing dust from the surface of the APS film 22 (see FIG. 8), dust-removing roller pairs 408 (which are respectively disposed to correspond to both ends in the transverse direction of the APS film 22) for removing dust from respective surfaces of magnetic recording layers 26A and 26B of the APS film 22 (see FIG. 8), a pair of magnetic information reading/writing portions 410 (which are respectively disposed to correspond to both ends in the transverse direction of the APS film 22) each having a magnetic head 41 0R used for reading magnetic information from a magnetic track of the APS film 22 and a magnetic head 410W used for writing magnetic information in the magnetic track, a perforation sensor 412 for detecting perforations 28 of the APS film 22 shown in FIG. 8, a conveying roller pair 414, a film supporting member 416 which straightens curvature occurring along the transverse direction of the APS film 22 to hold the APS film 22 so that the surface of the APS film 22 is made flat at a scan position of a frame image in the APS film 22 (actually, an elongated region having a narrow width in the longitudinal direction of the APS film 22), conveying roller pairs 418 and 420, and a temporarily winding portion 422 of the APS film 22 are arranged sequentially from a predetermined position where the above-described cartridge 402 is set, along the film pull-out direction (i.e., the direction indicated by arrow J).

Figure 6:
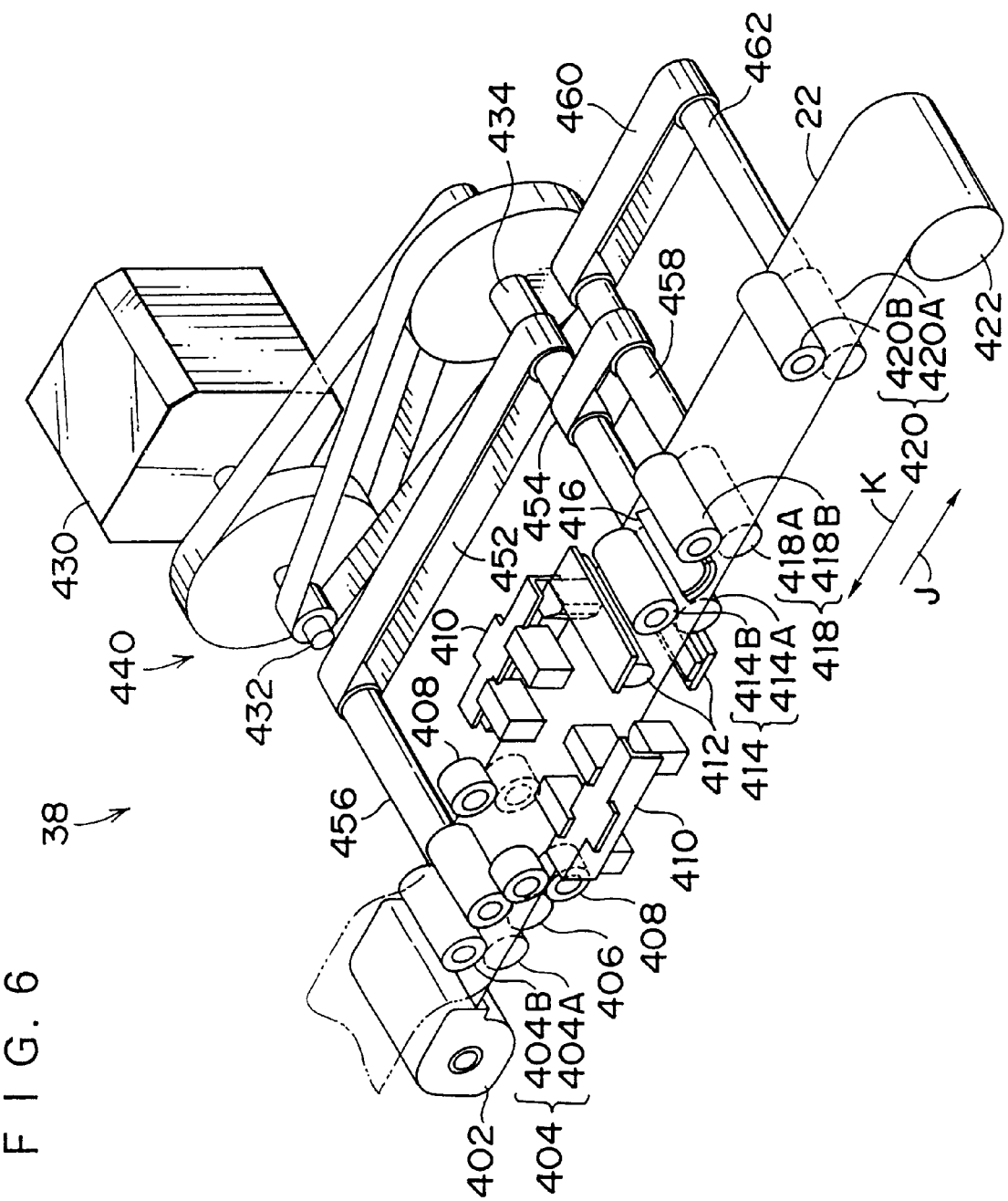
FIG. 6 is a perspective view which schematically shows the structure of a film carrier for an APS film.
Figure 7:
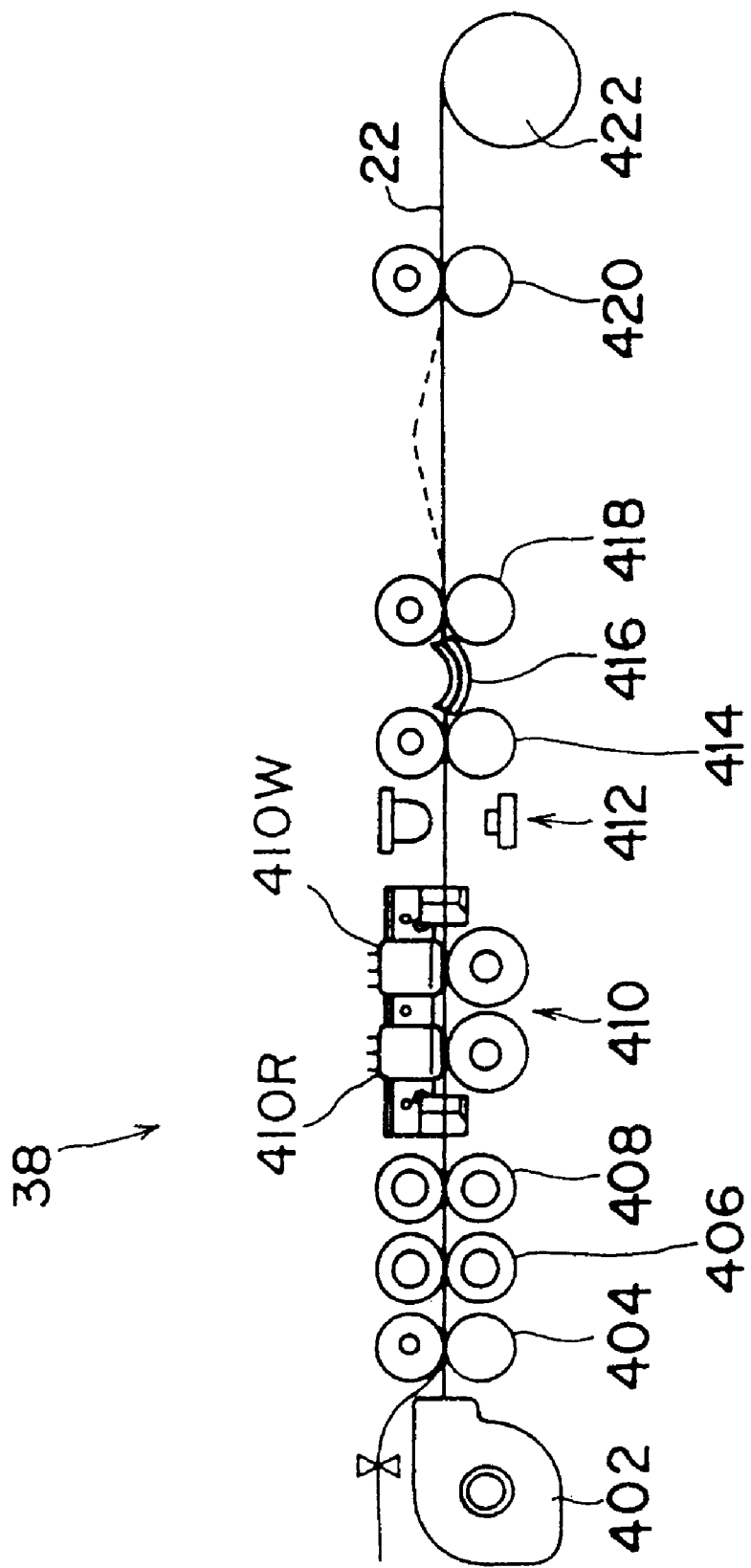
FIG. 7 is a diagram of the film carrier shown in FIG. 6 when seen from a direct transverse direction thereof perpendicular to a direction in which the film is conveyed.

In each of the conveying roller pairs 404, 414, 418, and 420, as illustrated in FIGS. 6 and 7, a lower roller is a driving roller (404A, 414A, 418A, 420A) and an upper roller is a driven roller (404B, 414B, 418B, 420B).

Further, the film carrier 38 is provided with a motor 430 which serves as a source of driving force for the driving rollers 404A, 414A, 418A, and 420A. A driving shaft 432 of the motor 430 and a driving shaft 434 of the conveying roller pair 414 are connected by a multiple stage transmission mechanism 440 including a plurality of pulleys each having different diametrical dimensions, a plurality of endless belts, and the like.

Endless belts 452 and 454 are each entrained onto the driving shaft 434 of the conveying roller pair 414. The endless belt 452 is also entrained onto a driving shaft 456 of the conveying roller pair 404 and the endless belt 454 is also entrained onto a driving shaft 458 of the conveying roller pair 418. An endless belt 460 is entrained onto the driving shaft 458 of the conveying roller pair 418 and is also entrained onto a driving shaft 462 of the conveying roller pair 420. As a result, the driving shaft 434 of the conveying roller pair 414 is driven to rotate due to driving force of the motor 430, and therefore, the driving shafts 456, 458, and 462 are also driven to rotate. Accordingly, when the rotational speed of the driving shaft 434 of the conveying roller pair 414 is changed by the multiple stage transmission mechanism 440 while the rotational speed of the motor 430 is being held constantly, the rotational speed of each driving shaft 456, 458, 462 is also changed and the conveying speed of the APS film 22 can be varied.

The scan position on the APS film 22 is located at a substantially intermediate portion between the conveying roller pairs 414 and 418. A slit-shaped hole for scan light is provided in a container (not shown) of the film carrier 38 at each of portions immediately above and below the scan position and is also provided at the film supporting member 416. Namely, as shown in FIG. 3, with respect to the APS film 22, which is being conveyed within the film carrier 38, scan light is irradiated from below the scan position, and the light transmitted through the film is directed to reach the line CCD 116 disposed above the film carrier 38.

The film carrier 38 contains a film delivery mechanism (not shown) which, when the cartridge 402 is set at the position shown in FIG. 6, pulls out a leading end of the APS film 22 from the cartridge 402 and automatically inserts the leading end in a nip portion of the conveying roller pair 404.

Further, in the film carrier 38, not only the APS film 22 accommodated in the cartridge 402, but also a strip film taken out from a cartridge can be conveyed along the same conveying path as the above by inserting a leading end of the film in the nip portion of the conveying roller pair 404 as indicated by the double-dashed chain line in FIG. 6.

The film supporting member 416 has a convex portion toward the lower side as shown in FIGS. 6 and 7, but may have the convex portion toward the upper side.

Display of an Image Plane During Test Operation

Figure 9:
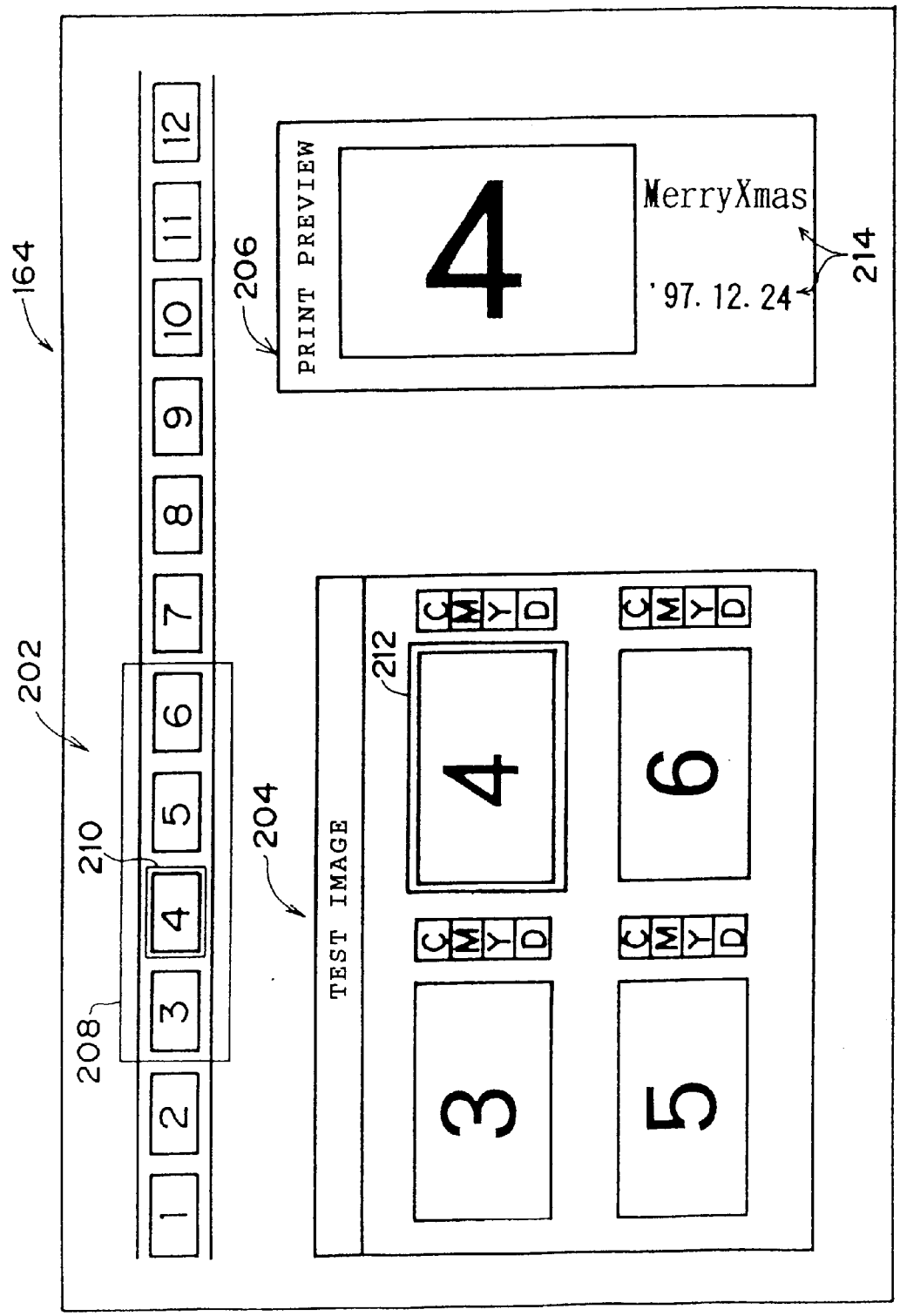
FIG. 9 schematically shows a film monitor image, a test image, and a print preview image.

At the time of the test operation, the personal computer 158 of this embodiment is, as shown in FIG. 9, structured to allow three kinds of images: a film monitor image 202 in which a predetermined number of frame images read by the pre-scan are indicated each time; a test image 204 in which a predetermined number of frame images (which predetermined number is designated by an operator; in FIG. 9, four frame images) to be subjected to the test operation in the film monitor image 202 is displayed sequentially for each time (which frame images are two or more images selected from plural images and displayed as thumb-nail images); and a print preview image 206 (which is a display region dedicated to an image having been subjected to test processing or being subjected to test processing) shown as a final output image in which a character string 214 or a template, prepared in advance by an operator, is set to be composed in a frame image having been subjected to the test operation or being subjected to the test operation (which frame image is one image further selected from the test image 204). Needless to say, at least two kinds of images among the three kinds of images can be simultaneously displayed on the display 164.

Further, in the film monitor image 202 including images of twelve frames, a enclosing line 208 which shows a range corresponding to the images of four frames in the test image 204 and a enclosing line 210 which shows an image corresponding to one image in the print preview image 206 are displayed. These enclosing lines 208 and 210 allow the operator to easily understand which images of the film monitor image 202 the four frames of the test image 204 and the one frame of the print preview image 206 respectively correspond to.

Moreover, in the test image 204 including images of four frames, a enclosing line 212 (enhancement) which shows an image corresponding to the image of the one frame of the print preview image 206 is displayed. The enclosing line 212 allows the operator to easily understand which image of the test image 204 the one frame of the print preview image 206 corresponds to.

FIG. 9 is a schematic diagram showing an overall display structure, and details thereof will hereinafter be described with reference to FIGS. 10 and 13.

Next, a display of an image plane during the test operation will be described in detail with reference to FIG. 10. FIG. 10 shows an example of the display in which, when the number of frames designated by an operator is six, the test image 204 including the six frame images is displayed during the test operation.

The test image 204 provides six frame images 230. Provided on the right side of each frame image 230 are a C-color correcting portion 240 for effecting color correction of cyan, an M-color correcting portion 242 for effecting color correction of magenta, a Y-color correcting portion 244 for effecting color correction of yellow, a density correcting portion 246 for effecting density correction of an entire image, and a number-of-sheets designating portion 248 for designating the number of sheets of prints.

A parameter-value adjusting portion including a numerical increase portion indicated by an upward arrow and a numerical decrease portion indicated by a downward arrow is provided on the right side of each of the above-described correcting portions and designating portion and is operated by the mouse 177 in such a manner as described below so as to effect designation and various corrections. For example, when the density of an entire image is desired to be made still lower, the operator clicks the mouse 177 at a numerical decrease portion 246B of the density correcting portion 246. One click operation allows a density value (for example, density value "1") displayed on the image plane to decrease by one. Accordingly, if the operator stops clicking the mouse 177 when the density value becomes a proper value, the density of the entire image can be set at the proper value.

Figure 10:
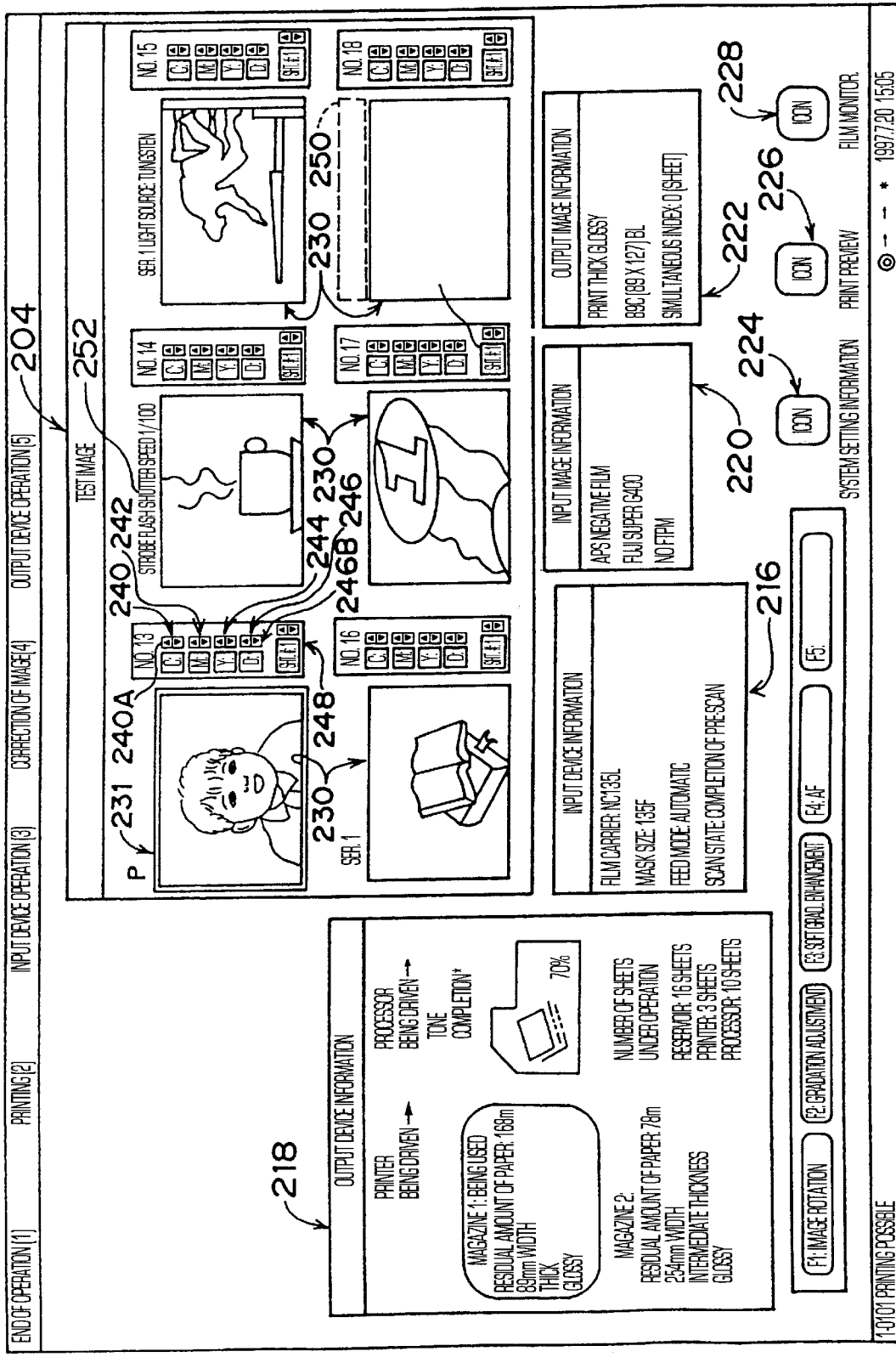
FIG. 10 shows the test image in which information such as information regarding the condition at the time of photographing is displayed such that information corresponds to each frame image.

Provided at the upper side of each frame image 230 is a display region of the information regarding the condition at the time of photographing and the like that corresponds to each frame image (i.e., a region 250 indicated by the broken line in FIG. 10 at the upper side of the frame image 230 at the lower right side in the test image 204 of FIG. 10). The region 250 allows display of the information regarding the condition at the time of photographing (described later) which is recorded as magnetic information on the APS film 22. Although only the region 250 corresponding to the frame image 230 at the lower right side is shown in FIG. 10, the above-described display region is provided for each frame image.

A enclosing line 231 given to the frame image 230 at the upper left side in the test image 204 of FIG. 10 indicates that the upper left frame image 230 is the frame image to be tested at the present time.

As auxiliary image planes for test processing, there are provided an input device information display screen 216 which displays information of a device for reading (inputting) an image, such as a film carrier or a mask, an output device information display screen 218 which displays information of a device for printing out an image, such as a printer or a processor, an input image information display screen 220 which displays information of a photographic film on which an image to be inputted is recorded, an output image information display screen 222 which displays information regarding a photographic printing paper onto which an image is printed, and the like, and a system setting information display screen (not shown) which allows setting and display of information regarding control of printing processing with respect to whether an index print is to be prepared, and the like. Each of icons used for display of each of the various auxiliary display planes are provided. In FIG. 10, an icon 224 for the system setting information display screen is shown.

Further, icons used for display of the film monitor image 202, the test image 204, and the print preview image 206, which have already been described in FIG. 9, are also provided, and in FIG. 10, an icon 226 for the print preview image and an icon 228 for the film monitor image are shown.

The input image information display screen 220 shown in FIG. 10 indicates that the photographic film on which the inputted frame image is recorded is an APS film and the product number thereof is "Super G400" manufactured by Fuji Photo Film Co., Ltd. "No FTPM (Fixed Time Print Mode)" indicated below the above product number means a mode in which all frame images are each printed under the same fixed printing condition has not been set.

Information Recorded as Magnetic Information on APS Film

Examples of the information to be recorded, as the magnetic information, on the APS film 22 will be described hereinafter. As the magnetic information, first, a film identification number of a predetermined number of digits (film ID), the photographing date and time, a title of a frame image, and a title of the film can be recorded. Among these, the title of the frame image or the title of the film may be freely inputted by a photographer, or may be selected from titles, registered in advance, by the photographer.

Further, as the magnetic information, the focal length of a lens of a camera used for photographing, maximum F-number of a lens, ISO sensitivity of a film, F-number of a camera, shutter speed, exposure bias setting, photometric mode, elapsed time, film additional number, owner identification number of a camera, serial number of a camera, information regarding whether or not FTPM (in which all frame images are printed under the same fixed printing condition), was set and information regarding whether or not a continuous scene was photographed can also be recorded.

Moreover, as the magnetic information, there can also be recorded the number of frames to be photographed on one film, photographing magnification, information regarding whether or not backlighting was used, direction in which flashlight is reflected (inward or outward), information regarding whether or not flash was used, amount of light during photographing, information about whether a proper exposure was obtained during photographing, kind of light source, and information regarding whether or not an artificial light source was used. Among these, with respects to the kind of light source, information regarding daylight, tungsten, fluorescent light, or the like is recorded.

Additionally, as the magnetic information, there can also be recorded the distance to a subject, position of a subject, print size (any one of C, H, and P), number of prints, information regarding whether or not a film with a lens (LF) was used, information which indicates the position where the film cartridge was mounted, and information which indicates the top and bottom of the image. Among these, the information about the position where the film cartridge was mounted indicates that the film cartridge was mounted at either the left-side end or the right-side end of a camera when seen from the photographer's standpoint. The information which indicates the top and bottom of the image indicates whether the top of the image corresponds to the side opposite to that where perforations are formed, the side toward a leader, the side toward a trailer, or to the side where perforations are formed.

Operation of the Embodiment

As the operation of the present embodiment, a control routine for reading a frame image and for image processing (see FIG. 11 and FIG. 12), which is executed by a CPU 160 of the personal computer 158, will be hereinafter described.

Figure 11:
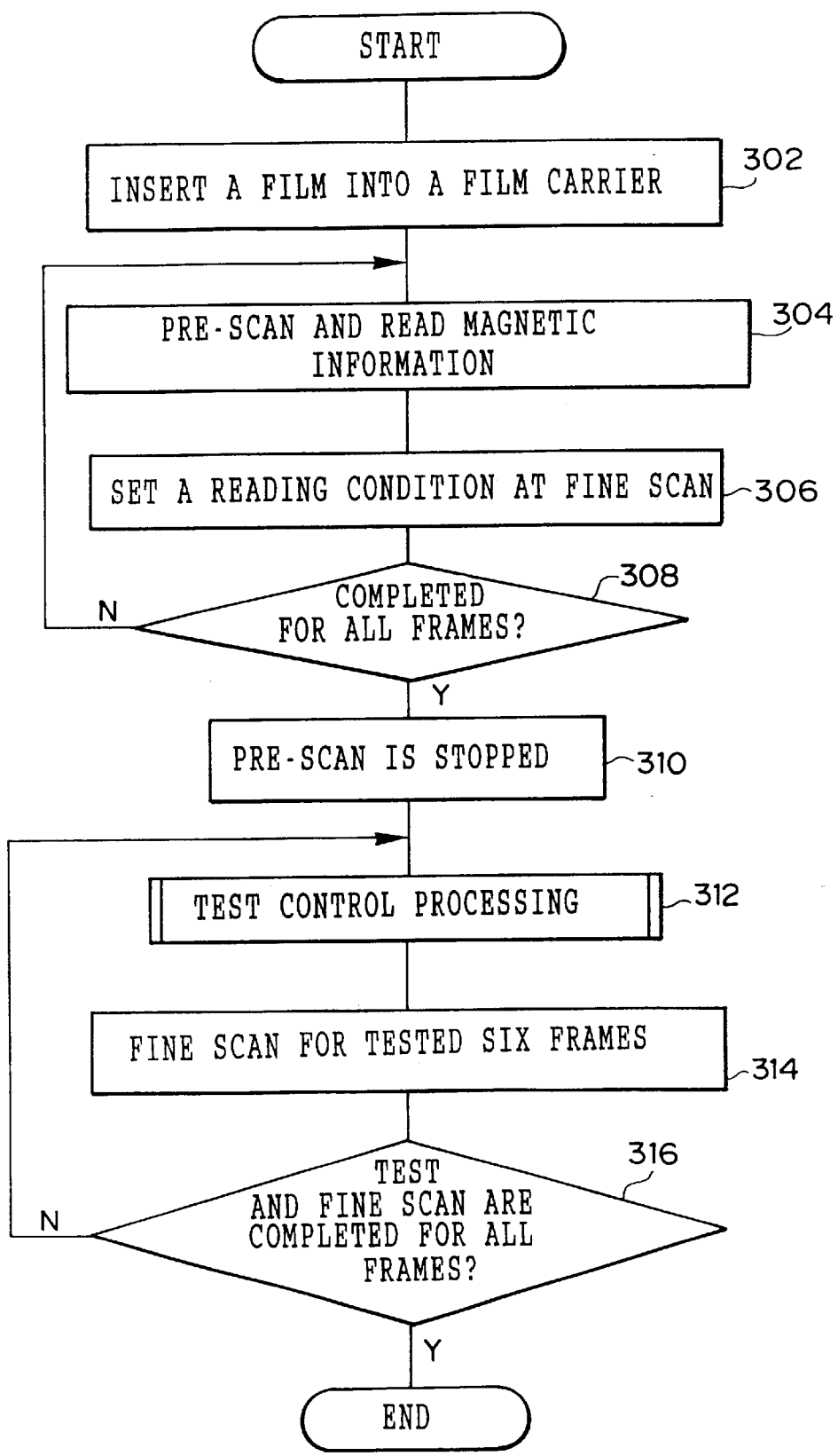
FIG. 11 is a flow chart which shows a control routine in the embodiment of the present invention.

When an operator sets the cartridge 402 at a predetermined position in the film carrier 38 and indicates start of reading of a frame image with the keyboard 166, execution of a processing routine of the control processing shown in FIG. 11 is started by the CPU 160 of the personal computer 158.

In step 302 shown in FIG. 11, the film 22 is inserted in the nip portion of the conveying roller pair 404 by a film deliver mechanism (not shown). Subsequently, when the driving rollers 404A, 414A, 418A, and 420A are driven to rotate by driving the motor 430 shown in FIG. 6, conveying of the film 22 in the film pull-out direction (i.e., the direction indicated by arrow J in FIG. 6) is started.

Subsequently, in step 304, an instruction to execute the pre-scan is given to the microprocessor 46 of the line CCD scanner 14 and an instruction to read magnetic information from the magnetic track of the film 22 is given to the magnetic information reading/writing portions 410.

As a result, magnetic information is read by the magnetic information reading/writing portions 410 from the film 22, which is being conveyed in the film pull-out direction. The microprocessor 46 recognizes the position of the frame image based on the result of detection by the perforation sensor 412 and executes the pre-scan of each of the frame images passing through the predetermined scan position between the conveying roller pairs 414 and 418.

At this time, the film 22 is held by the film supporting member 416. For this reason, there is no possibility of a slack portion forming on the surface of the film 22 or of the film 22 vibrating, and the proper pre-scan is thereby achieved. After the film 22 has passed through the conveying roller pair 420, the film 22 is wound by the temporarily winding portion 422.

Subsequently, in step 306, a reading condition for the fine scan is calculated and then set for each frame image by the automatic set-up engine 144 based on the result of the pre-scan of each frame image.

When the pre-scan and the setting of the reading condition for the fine scan have been completed for all the frame images, the process proceeds to step 310 and the pre-scan is stopped.

Figure 12:
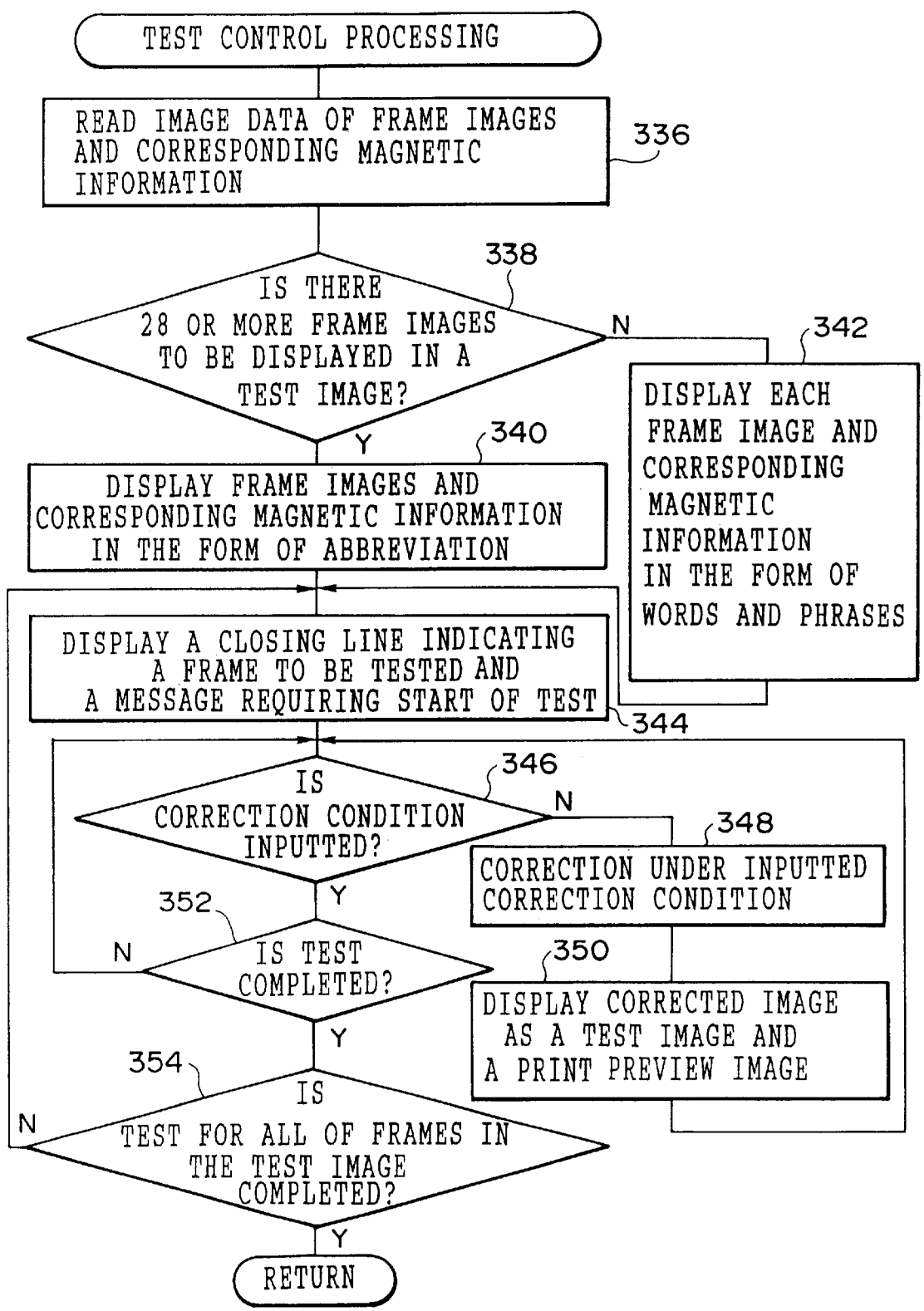
FIG. 12 shows a flow chart which illustrates a subroutine of test control processing.

Subsequently, in step 312, a subroutine of test control processing shown in FIG. 12 is executed. In the test control processing, first, in step 336, image data of frame images having finally been subjected to the pre-scan, the number of the frame images being designated by the operator, and magnetic information corresponding to the designated number of frame images are read.

In step 338, it is determined whether the number of frame images to be displayed on the test image 204 is 28 or more. The number of frame images mentioned herein is the number of frames designated by the operator in the test operation, that is, the number of frame images actually displayed, as test images, on the display 164.

If the number of frame images to be displayed on the test image 204 is 28 or more, the process proceeds to step 340. As shown in FIG. 13, frame images based on the read image data (that is, two or more images selected from the plural images) are displayed (as thumb-nail images) in frame image display regions 230 of the test image 204 and all or a portion of the read magnetic information (magnetic information required for the test operation, that is, collateral information of the present invention) is displayed by an abbreviation at upper sides (see reference numerals 254 and 256 in FIG. 13) of the image display regions 230.

On the other hand, if the number of frame images to be displayed on the test image 204 is less than 28, the process proceeds to step 342. As shown in FIG. 10, frame images based on the read image data are displayed in the frame image display regions 230 of the test image 204 and all or a portion of the read magnetic information is displayed in the form of words and phrases at upper sides (see reference numeral 250) of the image display regions 230.

Namely, in the present embodiment, a display mode of the magnetic information is altered in accordance with the number of frame images to be displayed on the test image 204 so that the magnetic information corresponding to a case in which the number of frame images is 28 or more is displayed by an abbreviation and the magnetic information corresponding to a case in which the number of frame images is less than 28 is displayed in the form of words and phrases.

A case in which the number of frame images is less than 28:

use of a strobe light shutter speed:1/100 light source:tungsten no FTPM

A case in which the number of frame images is 28 or more:

FFy

SS1/100

ILt

FTn

For example, in the test image 204 (in the case in which the number of frame images to be displayed on the test image 204 is less than 28) shown in FIG. 10, "P", which indicates that the photographing size is panorama size, is displayed with respect to the upper left frame image 230 (No. 13). The information regarding use of a strobe light and the shutter speed of 1/100 (second) is displayed with respect to the upper central frame image 230 (No. 14). Further, the information regarding use of tungsten as a light source is displayed with respect to the upper right frame image 230 (No. 15). "Ser. 1" displayed with respect to the upper right frame image 230 (No. 15) and the lower left frame image 230 (No. 16) indicates that these two frames form a continuous scene.

In an initial state, the above-described abbreviations used in the present invention are standard ones printed on a rear side of a photograph at the time of printing a photograph and are generally recognized.

Figure 13:
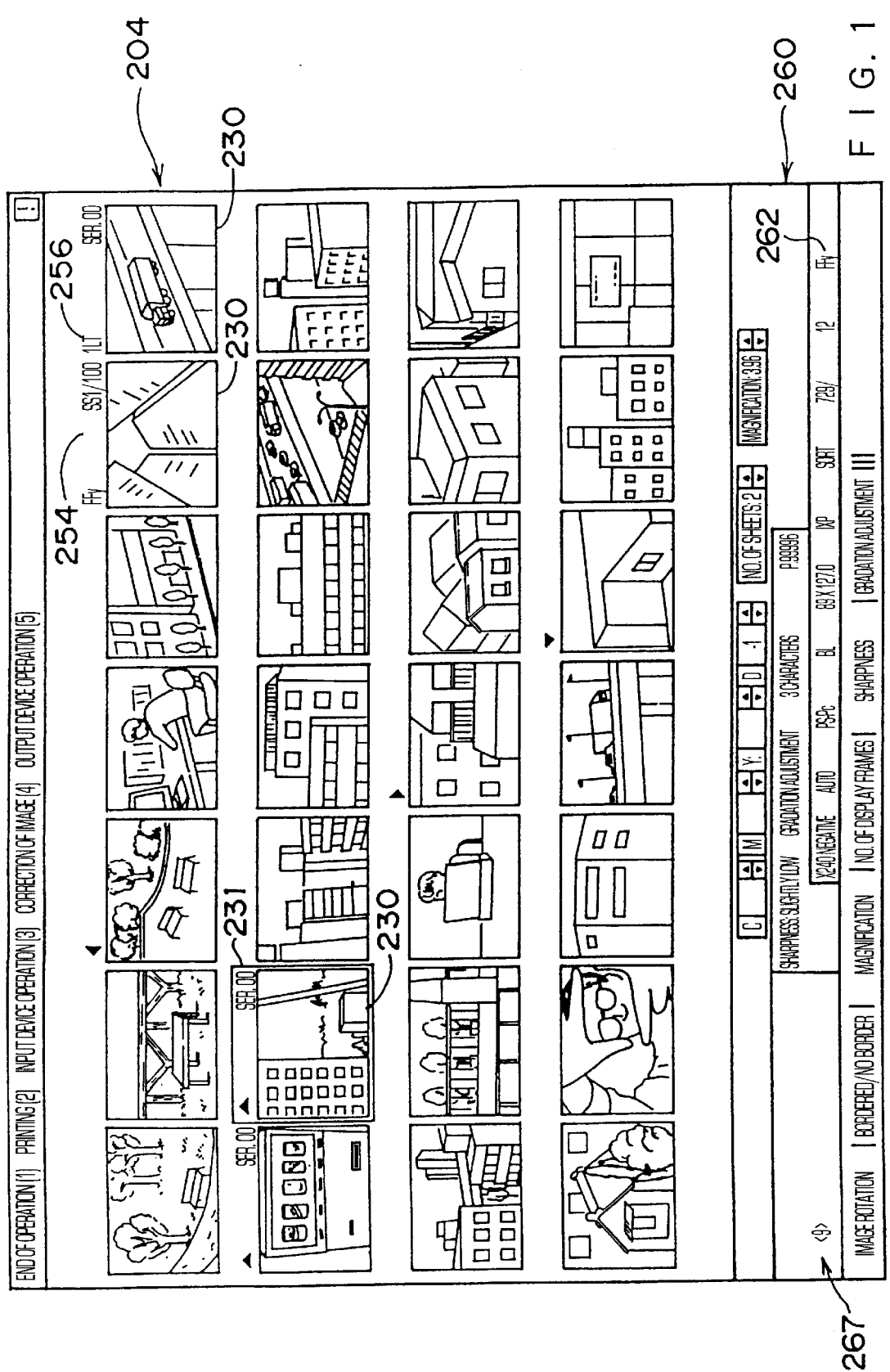
FIG. 13 shows another test image in which information such as information regarding the condition at the time of photographing is displayed such that information corresponds to each frame image.

Further, in the test image 204 (in the case in which the number of frame images to be displayed on the test image 204 is 28 or more) shown in FIG. 13, an abbreviation "FFy" which indicates use of a strobe light and an abbreviation "SS1/100" which indicates the shutter speed of 1/100 (second) are displayed, as shown by reference numeral 254, with respect to a frame image 230 located at the second frame from the right hand on the uppermost line in the test image 204. Moreover, an abbreviation "ILt" which indicates use of tungsten as a light source is displayed, as shown by reference numeral 256, with respect to a frame image 230 located at the right end on the uppermost line in the test image 204.

In the foregoing, when frame images and magnetic information thereof are displayed on the test image 204, the lower limit number of frame images in which the magnetic information cannot be recognized is set to be 28. However, the present invention is not limited to the same.

Further, when the number of frame images to be displayed on the test image 204 is the above-described lower limit in which the information cannot be recognized (in the above-described embodiment, 28) or more, the mode of the magnetic information to be displayed is made into a fixed display mode, but the present invention is not limited to the same. When the number of frame images to be displayed on the test image 204 is 28 or more, there is a possibility that the magnetic information cannot be recognized even if the mode of the magnetic information to be displayed is altered. Accordingly, when the number of frame images to be displayed on the test image 204 is more than 28 (that is, the lower limit number of frame images in which the information cannot be recognized even if the display mode is altered), for example, more than 40, the display mode of the magnetic information may be further altered. For example, when the abbreviation which indicates use of a strobe light is further altered to "F" and the abbreviation which indicates shutter speed is further altered to "SS1/100". In this case, the abbreviation used as a display mode is in advance determined, registered, or altered by an operator as occasion demands.

In the foregoing, the number of frame images to be displayed on the test image 204 is the number of frame images concretely displayed. Accordingly, even in a case in which there are 40 frame images to be displayed, for example, when negative films comprised of 6-frame pieces are subjected to pre-scan, the number of frame images to be concretely displayed on the test image 204 is 6 and the magnetic information thereof is displayed in the form of words and phrases.

In the above-described step 342, all or a portion of the read magnetic information is displayed. Namely, all of the read magnetic information may be displayed or only items of information required for the test processing, which have been set in advance, may be displayed.

As described above, at the time of the test operation, the operator can simultaneously refer to each frame image and to information such as the information regarding the condition at the time of photographing for the frame image, in association with each other.

Further, the image processing apparatus may be provided with indicating means, for example, a menu, a tool bar, an icon, or the like, for indicating display of images and all or a portion of collateral information. The operator indicates the display by the indicating means at a desired timing during the image test operation to thereby allow display of the image and the collateral information corresponding to the image. In this case, a priority order of information to be displayed in the collateral information is determined, and information of the operator-designating number of frame images or information of frame images in number corresponding to the size of a display region is displayed in order from the information having a highest priority. The priority order may be provided to correspond to priority information of collateral information printed on a rear side of a print. When necessary, the operator may effect setting for all of frame images collectively or separately, as to which information among the collateral information should be displayed or not. In the above-described embodiment, the display mode is changed in accordance with the number of images to be displayed, but the operator can also set the display mode or increase and decrease the number of information to be displayed by using a menu, a tool bar, or an icon.

In step 344, the enclosing line 231 which indicates the frame image that is the object of testing at the present time, and a message which calls for start of testing are displayed on the display 164, and the operator is thereby allowed to effect test processing.

In the test processing, for example, when the operator desires to further raise the density of color C relative to color Y or color M, the operator clicks the mouse 177 at a numerical increase portion 240A of the C-color correcting portion 240 displayed in the test image 204 shown in FIG. 10. When a correction condition of the color balance or the density of an entire image is inputted by the operator, in step 348, correction for the frame image to be tested is effected based on the inputted correction condition. In step 350, the corrected frame image is displayed as the test image 204 and also as the print preview image 206 (see FIG. 9), and thereafter, the process returns to step 346.

Each time a correction condition of the color balance or the density of the entire image is inputted in the test processing, a final output image of the frame image corrected based on the inputted correction condition can be referred to with the print preview image 206. On the other hand, an original image of the frame image that is the object of testing can be referred to with the film monitor image 202 which is displayed as occasion demands.

When input of desired correction conditions are completed, the operator indicates completion of testing of the frame image that is the object of testing, with a predetermined operation. At this time, the operator can give an instruction to print the frame image subjected to the test processing after completion of the fine scan, which will be described later.

When completion of testing of the frame image that is the object of testing is indicated by the operator, it is determined whether or not testing for all of the designated number of frames displayed as the test image 204 has been completed (step 354).

When testing for all of the designated number of frames has not been completed, the process returns to step 344, in which the enclosing line 231 is displayed with respect to a frame image to be subsequently tested and a message which calls for start of testing is also displayed, thereby allowing the operator to effect test processing.

As described above, the test processing is effected for the images of the designated number of frames displayed in the test image 204 one by one. When the test processing for all of the six frames has been completed, the process returns from the subroutine shown in FIG. 12 to the main routine shown in FIG. 11.

In step 314 of the main routine shown in FIG. 11, an instruction is given to the microprocessor 46 of the line CCD scanner 14 to execute the fine scan, which is based on the reading conditions set in the above-described step 306, of each of the images of the designated number of frames having been finally tested. The microprocessor 46 recognizes the position of each frame image based on the results of detection by the perforation sensor 412, and executes the fine scan, which is based on the reading conditions, of each of the frame images, passing through the predetermined scan position located between the conveying roller pairs 414 and 418. In this case, the fine scan is executed in the reverse order of that during the pre-scan, the designated number of frames each time while rewinding the film 22.

When an instruction to print a frame image is given by the operator, after completion of the fine scan for a frame image that is the object of testing, an image based on digital image data obtained by the fine scan is printed out by the output section 28 shown in FIG. 2.

Subsequently, in step 316, it is determined whether the test operation and the fine scan have been completed for all the frames. When the test operation and the fine scan have not been completed for all the frames, the process returns to the step 312, in which the test operation for subsequent images of the designated number of frames is executed.

As described above, when the test operation and the fine scan are effected six frames at a time and are completed for all the frames, the control routine shown in FIG. 11 ends.

Meanwhile, since the fine scan is executed while the film 22 is being rewound, rewinding of the film 22 is completed simultaneously with the completion of the fine scan for all the frames and the film 22 (the cartridge 402) is discharged from the film carrier 38.

In the above-described embodiment, during the test operation, each frame image and information such as the information regarding the condition at the time of photographing for each frame image are simultaneously displayed in the test image 204 in association with each other, and therefore, the operator can simultaneously refer to each frame image and information such as the information regarding the condition at the time of photographing for each frame image in association with each other and can also smoothly carry out the test operation for each frame image.

In this case, as described above, the display mode of the magnetic information when the number of frame images to be displayed on the test image 204 is 28 or more is changed from the display mode comprised of words and phrases (in a case in which the number of frame images is less than 28) to the display mode comprised of abbreviations. Therefore, even if the number of frame images to be displayed on the test image 204 increases, the magnetic information can be recognized.

In the above-described embodiment, the display mode of the magnetic information is altered in accordance with the number of frame images to be displayed on the test image 204, but the present invention is not limited to the same. The size of each of frame images changes in accordance with the number of frame images to be displayed, and therefore, the display mode of the magnetic information may also be altered in accordance with the size of each of frame images to be displayed. In the present embodiment: in a case in which one frame image is displayed, the number of pixels is set to be 321×215; in a case in which 4 or 6 frame images are displayed, the number of pixels is set to be 227×152; in a case in which 28 frame images are displayed, the number of pixels is set to be 107×81; and in a case in which 40 frame images are displayed, the number of pixels is set to be 93×70. Accordingly, when the number of pixels is 107×81 or less, the display mode of the magnetic information may be altered, and when the number of pixels is 93×70 or less, the display mode of the magnetic information may be further altered.

When an image to be displayed is of a panorama size (the number of pixels is 227×83), an area for displaying the magnetic information can be extended, and therefore, the magnetic information may also be displayed in the form of words and phrases.

Figure 15A:
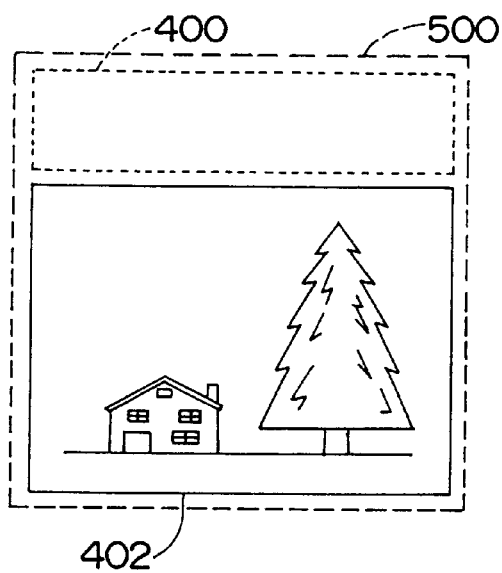
FIGS. 15A and 15B are diagrams which each show a collateral information display region whose size changes when a panorama-sized image is displayed.
Figure 15B:
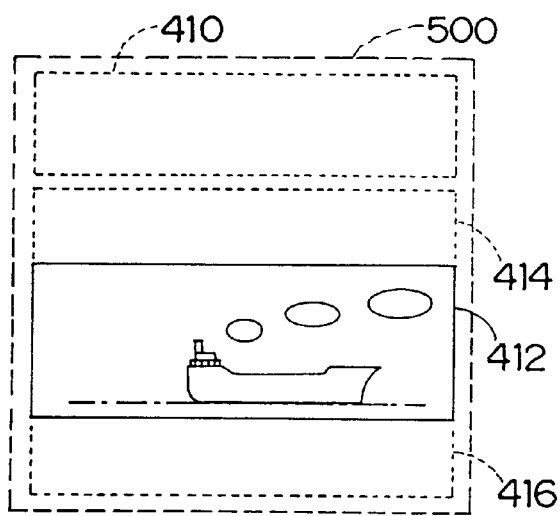

Namely, an image and collateral information thereof are, as shown in FIG. 15A, displayed in a previously-set region 500 of a predetermined size. An image 402 is displayed at a lower side of the region 500 and collateral information is displayed in a remaining region 400 (in FIG. 10, the region 250). When an image 412 of panorama size (the number of pixels is 227×83) is displayed (see FIG. 15B), the number of pixels in the panorama-size image is smaller than that of pixels in an ordinary image, and therefore, blank spaces 414 and 416 are formed respectively at upper and lower sides of each frame image of panorama size. Accordingly, the collateral information may also be displayed in the blank spaces 414 and 416 in addition to the region 410 corresponding to the ordinary information display region 400. In other words, in place of or along with the control routine shown in FIG. 12, a determination is made as to whether the frame image displayed in the test image is a panorama-size image. When the panorama-size image is displayed, the collateral information is displayed in the form of characters (or an abbreviation) in regions 410, 412, and 416 other than the image region 412 within the region 500 of a predetermined size. A determination as to whether an image to be displayed is of panorama size is made based on the result of pre-scan.

Further, the magnetic information may be displayed in accordance with all of frame images to be displayed in the test image 204, and the magnetic information may also be displayed for a frame image selected as an object of test processing at the present time among displayed frame images. In this case, the magnetic information is displayed in the form of words and phrases, or may be displayed in the form of abbreviation.

In the foregoing, the magnetic information is displayed at the upper side of a frame image, but the present invention is not limited to the same. As shown in FIG. 13, magnetic information corresponding to a frame image selected as an object of test processing at the present time may also be displayed in a status bar 260. In this case, the magnetic information may be displayed in the form of words and phrases or in the form of abbreviation. In other words, in an example shown in FIG. 13, abbreviation "FFy" which is one of the magnetic information corresponding to the frame image selected as an object of test processing at the present time is displayed. The abbreviation "FFy" may also be displayed in the form of words and phrases, which is "use of a strobe light". The reference numeral 267 located at the left side of the status bar indicates a frame number.

Here, a frame image which becomes an object of test processing (in FIG. 9, the print preview image 206) is that which is selected as the test image 204 from the film monitor image 202 and enhanced by the enclosing line 210 within the enclosing line 208 in the film monitor image 202, and further, selected for print preview in the test image 204 and enhanced by the enclosing line 212.

Figure 16:
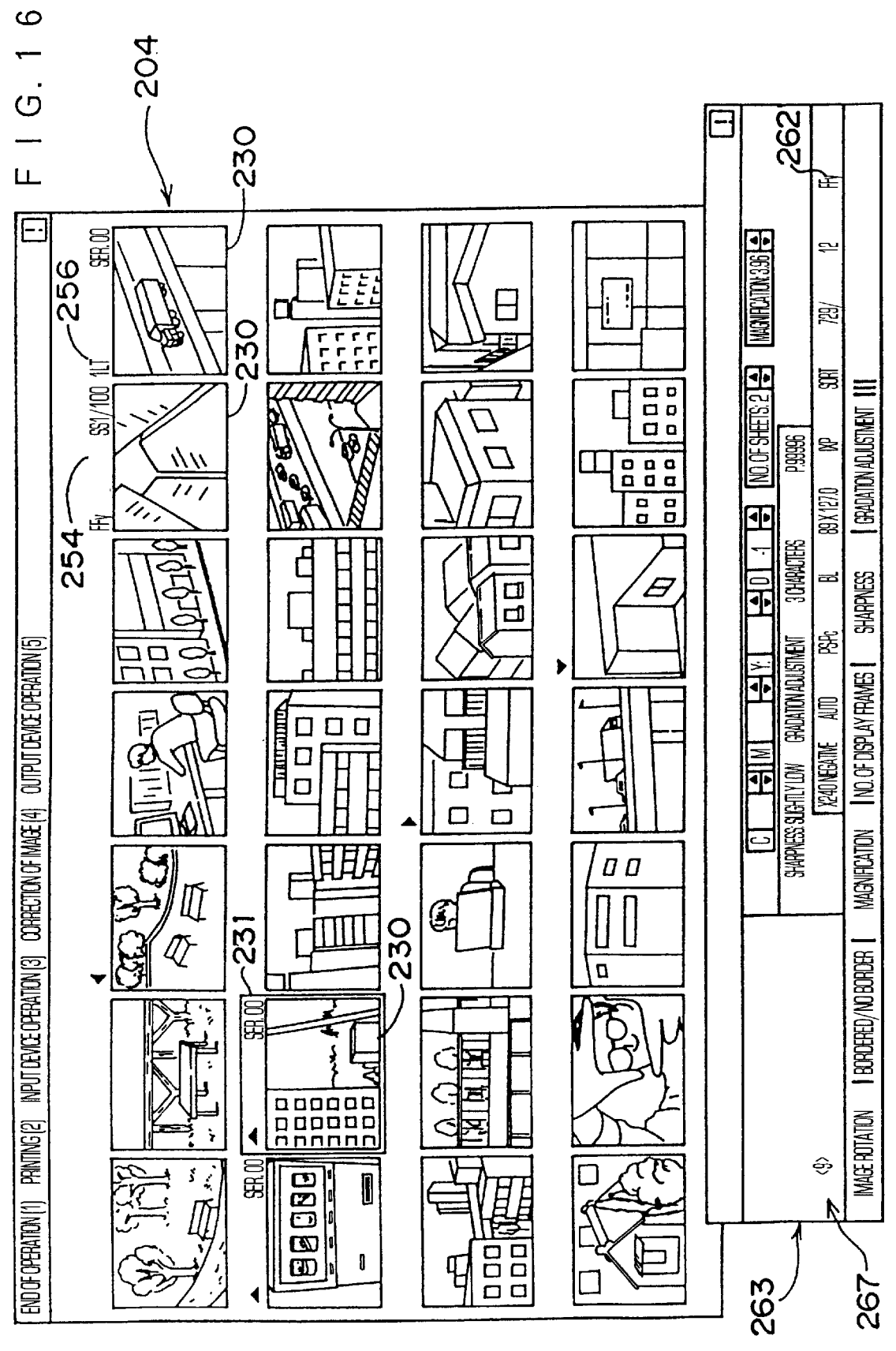
Figure 17:
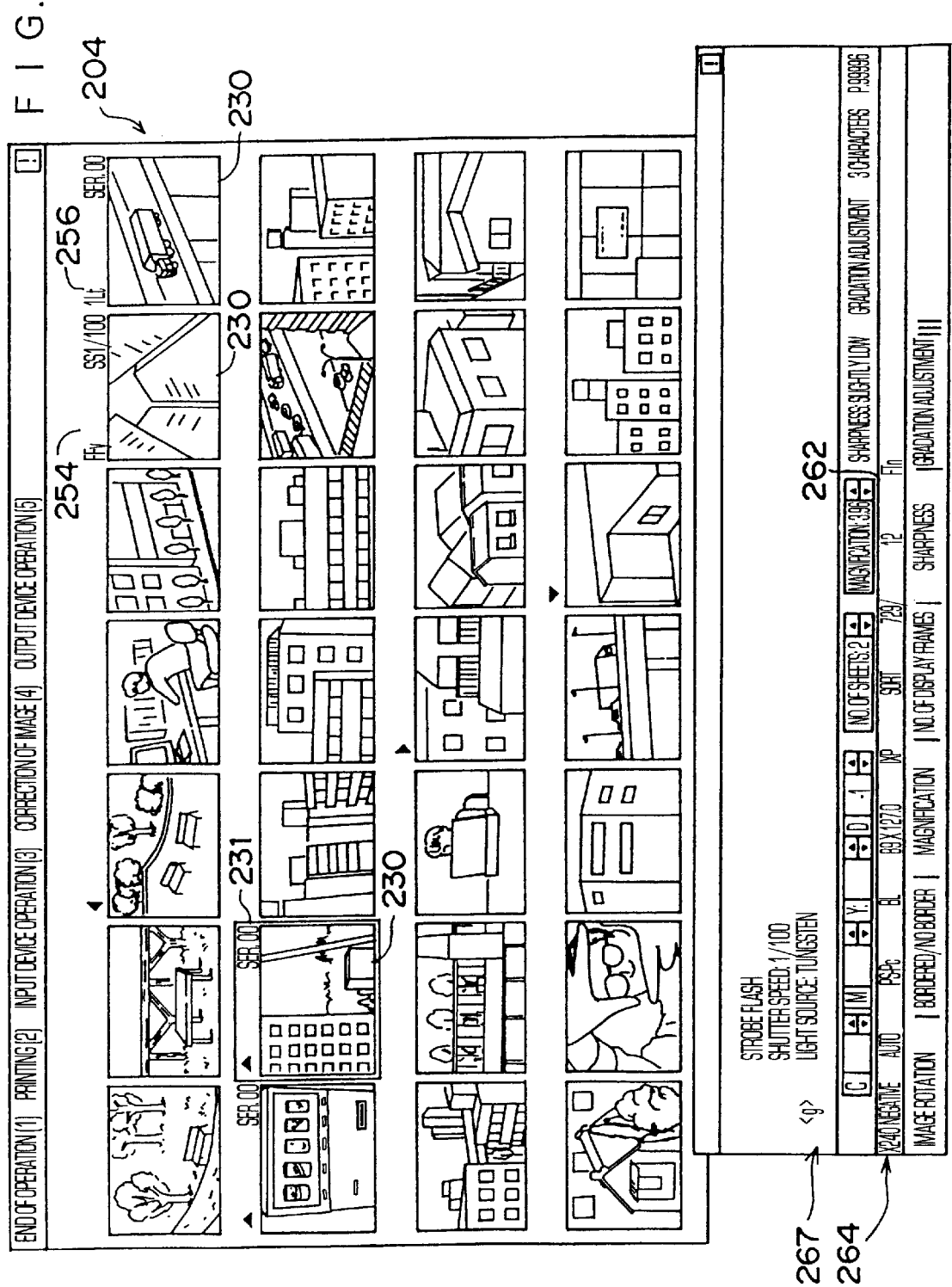
FIG. 17 is a diagram which shows an enlarged display region of collateral information of images to be tested, and a test image.
Figure 18:
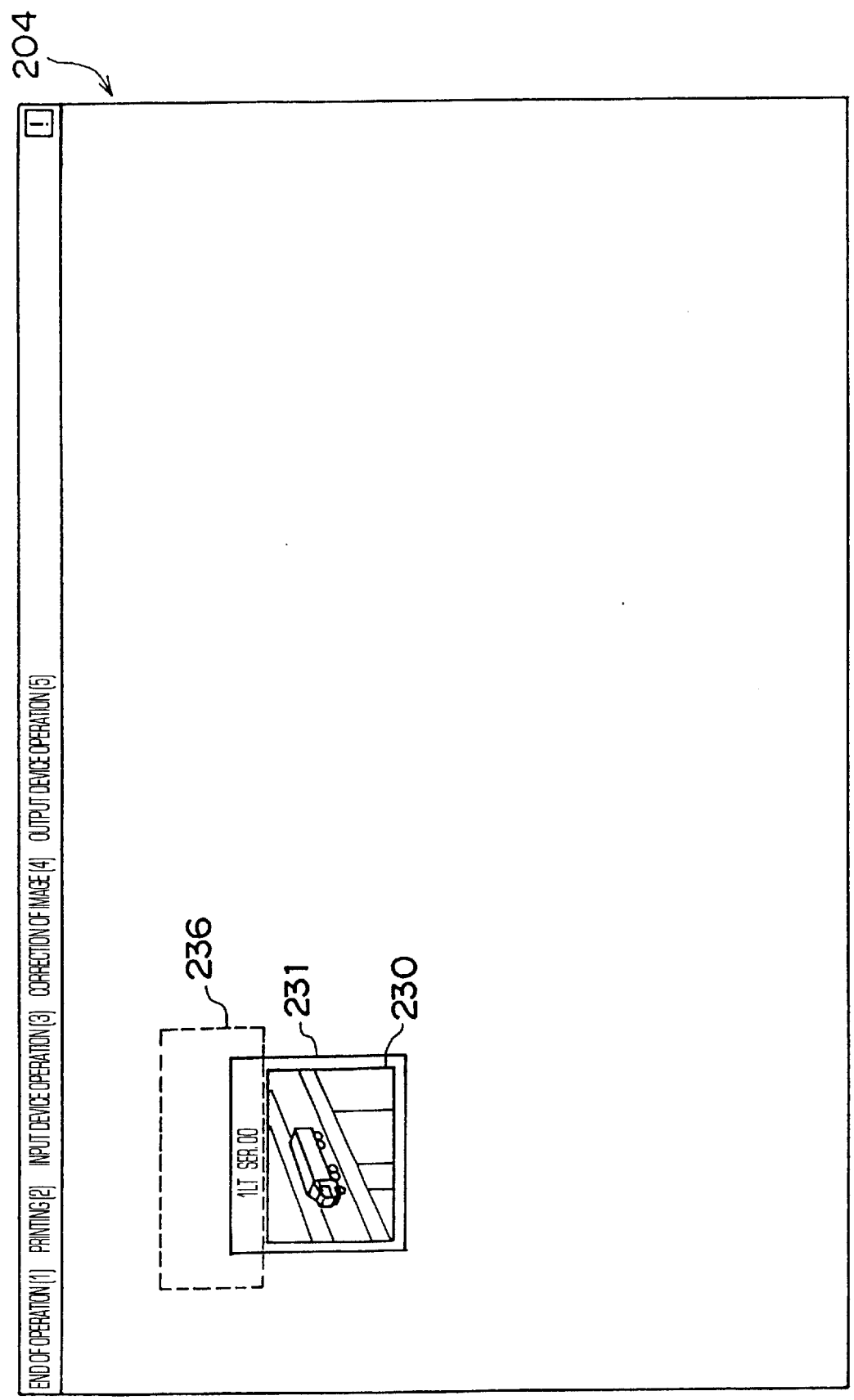
FIG. 18 is a diagram which shows a test image in which images other than an image to be tested are not displayed.

The collateral information of a frame image, which is selected as a preview image and is to be outputted, is displayed not only in the status bar (in FIG. 13, indicated by reference numeral 260) formed as a dedicated display region, but also in another window 263 (see FIG. 16) different from the window 204 on which frame images are displayed at the present time. The window 263 can be enlarged as in a window 264 shown in FIG. 17. When the window is enlarged, the display mode of the collateral information to be displayed may be altered or the number of the information may be increased. A display space is determined by initialization, but it may be set by an operator using a menu, a tool bar, or an icon. Further, as shown in FIG. 18, a frame image to be tested and collateral information thereof may only be displayed by providing no dedicated display region without frame images other than the frame image to be tested and collateral information of the frame images being displayed. Alternatively, as shown in FIG. 19, collateral information of frame images other than the frame image to be tested may be deleted.

Further, in the foregoing, there was described an example in which the information regarding the condition at the time of photographing and the frame images are simultaneously displayed in correspondence with each other on the basis of the magnetic information recorded on the film 22. However, as shown in FIG. 14, when optical information 27 such as a bar code or a DX code is recorded on the film 22 in addition to the magnetic information, it is desirable that the optical information 27 is optically read and information such as the information regarding the condition at the time of photographing obtained by the optical reading is also displayed in correspondence with the frame images. Further, it is also desirable to provide control so that, with items of information to be displayed, namely, the items of information required for the test processing being set in advance from among the information based on magnetic information or optical information, only the previously-set items of information be displayed.

Further, the recording medium having a frame image and the collateral information such as the information regarding the condition at the time of photographing recorded thereon may also be a semiconductor memory, CD-R, MO (photo-magnetic disk), FD, network HD and is not limited to a photographic film. Also, the collateral information can include an output information of a recording medium.

The image that is the object of testing is not limited to a frame image recorded on a photographic film or the like, and may be an image obtained by photography using a digital camera, or an image prepared by an external image processing apparatus or the like. In this case, it suffices that digital image data be directly inputted from the digital camera or the external image processing apparatus to the image processing apparatus according to the present invention.

Further, in the above-described embodiment, the test control processing (see FIG. 12) is effected so that the magnetic information corresponding to each frame image is reliably displayed. However, it is possible to effect control so that only when a predetermined operation is effected by an operator is the magnetic information displayed.

Moreover, in the above-described embodiment, there was described an example in which two reading operations, namely, the pre-scan and the fine scan, are effected for each frame image. However, by effecting, from the first, the fine scan for each frame image at a high resolution, the number of times the reading operation is carried out may be set at one. For example, when only the fine scan is effected, a pixel-sampled image or a gradation-limited image may be displayed as the test image 204.

The number of frames to be displayed as the test image 204 is not limited to six as in FIG. 10. For example, less than or more than six frame images may be simultaneously displayed as the test image 204.

As the image data that is the object of testing in the test operation, analog image information may be used in addition to digital image data. In the present embodiment, there was described a case in which the present invention is applied to a digital photographic printer. However, the present invention can also be applied to an analog photographic printer in which light transmitted through a photographic film is used for printing an image onto a photographic printing paper. In this case as well, the above-described effects of the present invention can be obtained.

What is claimed is:

1. An image processing apparatus in which image data to be recorded on a recording material is prepared based on image data recorded on a recording medium on which one image or plural images and collateral information, comprising:

information display means which displays information; and display control means which simultaneously displays, on said information display means, an image based on the image data recorded on the recording medium and at least a portion of the collateral information including at least a portion of the photographic information corresponding to the image in association which each other, said collateral information having photographic information which indicates conditions under which the image data was recorded on the recording medium of the image or of each of the images, are recorded, wherein said display control means alters at least one of a mode and an amount of the collateral information to be displayed on said information display means in accordance with a number or a size of display images.

2. An image processing apparatus according to claim 1, further comprising:

indicating means for indicating so that the image and all or a portion of the collateral information is displayed, wherein said display control means, when an indication is given by said indicating means, simultaneously displays the image and the collateral information on said information display means and in association with each other.

3. An image processing apparatus according to claim 1, wherein the collateral information includes plural information, and said display control means displays, on said information display means, information selected from the plural information.

4. An image processing apparatus according to claim 1, wherein the collateral information includes plural information and a priority order is set for the plural information, and said display control means displays at least one information of the collateral information on said information display means in accordance with the priority order.

5. An image processing apparatus in which image data to be recorded on a recording material is prepared based on image data recorded on a recording medium on which plural images and collateral information comprising:

information display means which displays information; and display control means which simultaneously displays, on said information display means, plural images based on the image data recorded on the recording medium and at least a portion of the collateral information including at least a portion of the photographic information corresponding to the images in association which each other, said collateral information having photographic information which indicates conditions under which the image data was recorded on the recording medium of the image or of each of the images, are recorded, wherein said display control means allows enhancement of the collateral information corresponding to one image selected from the plural.

6. An image processing apparatus according to claim 5, wherein said display control means displays all or a portion of the collateral information of the selected one image in a predetermined region.

7. An image processing apparatus according to claim 6, wherein said display control means allows enlargement of the region in which all or a portion of the collateral information of the image is displayed, and when the region is enlarged, said display control means increases collateral information to be displayed.

8. An image processing apparatus according to claim 5, wherein said display control means effects one of deleting images other than the selected one image and collateral information of the images, and deleting only the collateral information of the images, to thereby allow enhancement of the selected one image, and said display control means displays the collateral information of the selected one image in the deleted region.

9. An image processing apparatus in which image data to be recorded on a recording material is prepared based on image data recorded on a recording medium on which one image or plural images, and collateral information comprising:

information display means which displays information; and display control means which simultaneously displays, on said information display means, an image based on the image data recorded on the recording medium and at least a portion of the collateral information including at least a portion of the photographic information corresponding to the image in association with each other, said collateral information having photographic information which indicates conditions under which the image data was recorded on the recording medium of the image or of each of the images, are recorded, wherein said display control means displays the image in a region having a predetermined size and provided for the image, and further displays the at least a portion of the collateral information corresponding to the image in a remaining part of the region.

10. An image processing apparatus in which image data to be recorded on a recording material is prepared based on image data recorded on a recording medium on which one image or plural images, and collateral information comprising:

information display device which displays information; and display control device which simultaneously displays, on said information display device, an image based on the image data recorded on the recording medium and at least a portion of the collateral information including at least a portion of the photographic information corresponding to the image in association which each other, said collateral information having photographic information which indicates conditions under which the image data was recorded on the recording medium of the image or of each of the images, are recorded, wherein said display control device alters at least one of a mode and an amount of the collateral information to be displayed on said information display device in accordance with a number or a size of display images.

11. An image processing apparatus in which image data to be recorded on a recording material is prepared based on image data recorded on a recording medium on which plural images and collateral information comprising:

information display device which displays information; and display control device which simultaneously displays, on said information display device, plural images based on the image data recorded on the recording medium and at least a portion of the collateral information including at least a portion of the photographic information corresponding to the images in association which each other, said collateral information having photographic information which indicates conditions under which the image data was recorded on the recording medium of the image or of each of the images, are recorded, wherein said display control device allows enhancement of the collateral information corresponding to one image selected from the plural.

12. An image processing apparatus in which image data to be recorded on a recording material is prepared based on image data recorded on a recording medium on which one image or plural images, and collateral information comprising:

information display device which displays information; and display control device which simultaneously displays, on said information display device, an image based on the image data recorded on the recording medium and at least a portion of the collateral information including at least a portion of the photographic information corresponding to the image in association with each other, wherein said display control device displays the image in a region having a predetermined size and provided for the image, and further displays the at least a portion of the collateral information corresponding to the image in a remaining part of the region, said collateral information having photographic information which indicates conditions under which the image data was recorded on the recording medium of the image or of each of the images, are recorded.

* * * * *

UNITED STATES PATENT AND TRADEMARK OFFICE
CERTIFICATE OF CORRECTION

PATENT NO.     : 6,330,051 B1
DATED          : December 11, 2001
INVENTOR(S)    : Teruo Takanashi Page 1 of 1

It is certified that error appears in the above-identified patent and that said Letters Patent is hereby corrected as shown below:

<u>Title page,</u>
Item [56], References Cited, U.S. PATENT DOCUMENTS, delete "5,745,318" and insert -- 5,745,218 --.

Signed and Sealed this

Third Day of September, 2002

Attest:

Attesting Officer

JAMES E. ROGAN
*Director of the United States Patent and Trademark Office*